US012783999B2

(12) United States Patent
Yang

(10) Patent No.: US 12,783,999 B2
(45) Date of Patent: Nov. 3, 2026

(54) METHOD AND SYSTEM FOR MANAGING SW OF MANUFACTURING AND PRODUCTION FACILITY FOR SBOM RESPONSE

(71) Applicant: INJE UNIVERSITY INDUSTRY-ACADEMIC COOPERATION FOUNDATION, Gimhae-Si (KR)

(72) Inventor: Jinhong Yang, Gimhae-Si (KR)

(73) Assignee: INJE UNIVERSITY INDUSTRY-ACADEMIC COOPERATION FOUNDATION, Gimhae-Si (KR)

(*) Notice: Subject to any disclaimer, the term of this patent is extended or adjusted under 35 U.S.C. 154(b) by 43 days.

(21) Appl. No.: 19/045,581

(22) Filed: Feb. 5, 2025

(65) Prior Publication Data

US 2025/0348841 A1 Nov. 13, 2025

(30) Foreign Application Priority Data

May 10, 2024 (KR) ........................ 10-2024-0061705
Aug. 5, 2024 (KR) ........................ 10-2024-0103713
Oct. 21, 2024 (KR) ........................ 10-2024-0143850

(51) Int. Cl.
*G06Q 10/0875* (2023.01)
*G06F 8/71* (2018.01)
*G06F 21/57* (2013.01)

(52) U.S. Cl.
CPC ........... *G06Q 10/0875* (2013.01); *G06F 8/71* (2013.01); *G06F 21/572* (2013.01)

(58) Field of Classification Search
CPC .... G06Q 10/0875; G06Q 10/20; G06Q 50/04; G06F 8/71; G06F 8/65; G06F 21/572
USPC ........................................................... 705/29
See application file for complete search history.

(56) References Cited

U.S. PATENT DOCUMENTS

2015/0169311 A1* 6/2015 Dickerson ................. G06F 8/65
717/170
2024/0022609 A1* 1/2024 Smith ................. G06F 11/3006

FOREIGN PATENT DOCUMENTS

| | | | |
|---|---|---|---|
| CN | 117892267 | A | 4/2024 |
| JP | 2022013452 | A | 1/2022 |
| KR | 20190134879 | A | 12/2019 |
| KR | 20210151926 | A | 12/2021 |

(Continued)

OTHER PUBLICATIONS

Yalli, Jameel Shehu et al. Internet of Things (IoT): Origins, Embedded Technologies, Smart Applications, and Its Growth in the Last Decade. IEEE Access, vol. 12, 2024. (Year: 2024).*

*Primary Examiner* — Fawaad Haider
(74) *Attorney, Agent, or Firm* — S. J. Intellectual Property Limited

(57) ABSTRACT

The present disclosure relates to a method and system for managing SW of a manufacturing and production facility for an SBOM response, which may be configured to manage the SW update history of at least one piece of equipment while monitoring the SW update of the equipment within a manufacturing environment and to generate SBOM information by using the SW update history as a response to a request. In embodiments of the present disclosure, the SW update may be individually performed the equipment by at least one edge node connected to the equipment and monitored through the edge node.

14 Claims, 16 Drawing Sheets

(56) References Cited

FOREIGN PATENT DOCUMENTS

KR 20230017556 A 2/2023

* cited by examiner

METHOD AND SYSTEM FOR MANAGING SW OF MANUFACTURING AND PRODUCTION FACILITY FOR SBOM RESPONSE

CROSS-REFERENCE TO RELATED APPLICATION

This application is based on and claims priority under 35 U.S.C. 119 to Korean Patent Application No. 10-2024-0061705, filed on May 10, 2024, Korean Patent Application No. 10-2024-0103713 filed on Aug. 5, 2024, and Korean Patent Application No. 10-2024-0143850 filed on Oct. 21, 2024 in the Korean intellectual property office, the disclosures of which are herein incorporated by reference in their entireties.

TECHNICAL FIELD

The present disclosure relates to a method and system for managing software (SW) of a manufacturing and production facility for a software bill of materials (SBOM) response.

BACKGROUND OF THE DISCLOSURE

Manufacturing environments are rapidly transformed digitally. Multiple manufacturing and production facilities are connected to networks. The connected production facilities are essentially required to increase productivity through factory automation, remote control, and artificial intelligence (AI).

Software (SW) that controls an operation and management is installed in the production facilities. Periodical/aperiodical updates of SW essentially occur due to issues, such as a change and optimization of a production process and SW version-up. In addition to programmable logic controller (PLC) equipment, self SW is installed in multiple production facilities for more effective control and management. For a smart factory, multiple production facilities are connected to an internal network.

When SW is updated in a production facility environment, security vulnerability occurs due to internal worker or the connection of an external network. In the case of the update of SW installed in an individual production facility, the SW can be easily accessed and updated if only individual rights are obtained. If SW of an external supplier is to be updated, the SW may be updated by temporarily connecting a corresponding device to an external network or downloading separate SW.

A device and an application that are managed in a production facility environment tend to have their data changed, forged, or misused by cyber attacks. According to reports, it was found that manufacturing business in the industry field is most exposed to cyber attacks. In particular, it is considered that middle-sized and small-sized manufacturing companies are more vulnerable to cyber attacks because the middle-sized and small-sized manufacturing companies are considered as easy entry points to a greater supply network.

In the United States, the administrative order (EO 14028) that reinforces SW supply network security was issued on May 2021. With respect to self-attestation requirement, firmware inclusion, vendor responsibility for product security, etc., a SW developing company is required to confirm whether the SW developing company observes the NIST guideline when supplying a product to a U.S. government institution. Some U.S. institutions request third party evaluation according to system importance.

A SW developing company is required to reveal all of the sources of open source components that are used in a library in addition to a safe development process for SW and to validate the safety of the SW. A company develops an application by using various types of open source SW and installs the application in hardware. The company is required to check whether vulnerability is present in the open source included in a process and to write and submit SBOM, that is, specifications including all of pieces of information used in the SW development.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Embodiments of the present disclosure provide a method and system for managing SW of a manufacturing and production facility for an SBOM response.

In embodiments of the present disclosure, a method of managing software (SW) of a manufacturing and production facility for a software bill of materials (SBOM) response, which is performed by a computer system, may include managing a SW update history of equipment while monitoring a SW update of at least one piece of equipment within a manufacturing environment, and generating SBOM information based on the SW update history as a response to a request.

In embodiments of the present disclosure, a computer system for managing software (SW) of a manufacturing and production facility for a software bill of materials (SBOM) response may include a SW configuration server configured to manage a SW update history of equipment while monitoring a SW update of at least one piece of equipment within a manufacturing environment and a SW configuration repository configured to store the SW update history. The SW configuration server may be configured to generate SBOM information based on the SW update history from the SW configuration repository as a response to a request.

In the embodiments of the present disclosure, when a SW update of specific equipment that is used in a production facility occurs, the production facility can be safely used against internal and external SW attacks by effectively managing workers and a SW update history (e.g., a data source or an update history). Furthermore, in the embodiments of the present disclosure, it is expected that a producer can request compensation based on management and quality guarantee by confirming a SW issue upon manufacturing and production based on objective monitoring in relation to the management of SW for a production facility in a manufacturing environment.

DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein.

DETAILED DESCRIPTION

Hereinafter, the present disclosure provides a method and system for managing SW of a manufacturing production facility for an SBOM response.

While illustrative embodiments have been illustrated and described, it will be appreciated that various changes can be made therein without departing from the spirit and scope of the disclosure.

Embodiments of the present disclosure provide a function for monitoring a SW update process occurring in a manufacturing environment and managing the SW update process. Specifically, embodiments of the present disclosure provide a function for managing the SW update history of a production facility in a manufacturing environment and controlling updates based on a network in a sandbox form at the center when the updates occur. Furthermore, in embodiments of the present disclosure, an edge node device is attached to various network interfaces (e.g., RS232C, Serial, USB, SCADA, and a LAN) included in a production facility so that the edge node device is separately installed, and monitors a process related to SW updates.

In embodiments of the present disclosure, a production facility can be safely used against internal and external SW attacks by effectively managing worker and SW update histories (e.g., a data source and an update history) through the accurate management of a manufacturing environment when SW updates of specific equipment that is used in a production facility occur. Furthermore, in embodiments of the present disclosure, it is expected that a producer may request compensation based on management and quality guarantee by checking a SW issue upon manufacturing and production based on objective monitoring in relation to the management of SW for a production facility in a manufacturing environment.

Hereinafter, various embodiments of the present disclosure are described with reference to the accompanying drawings.

Figure 1:
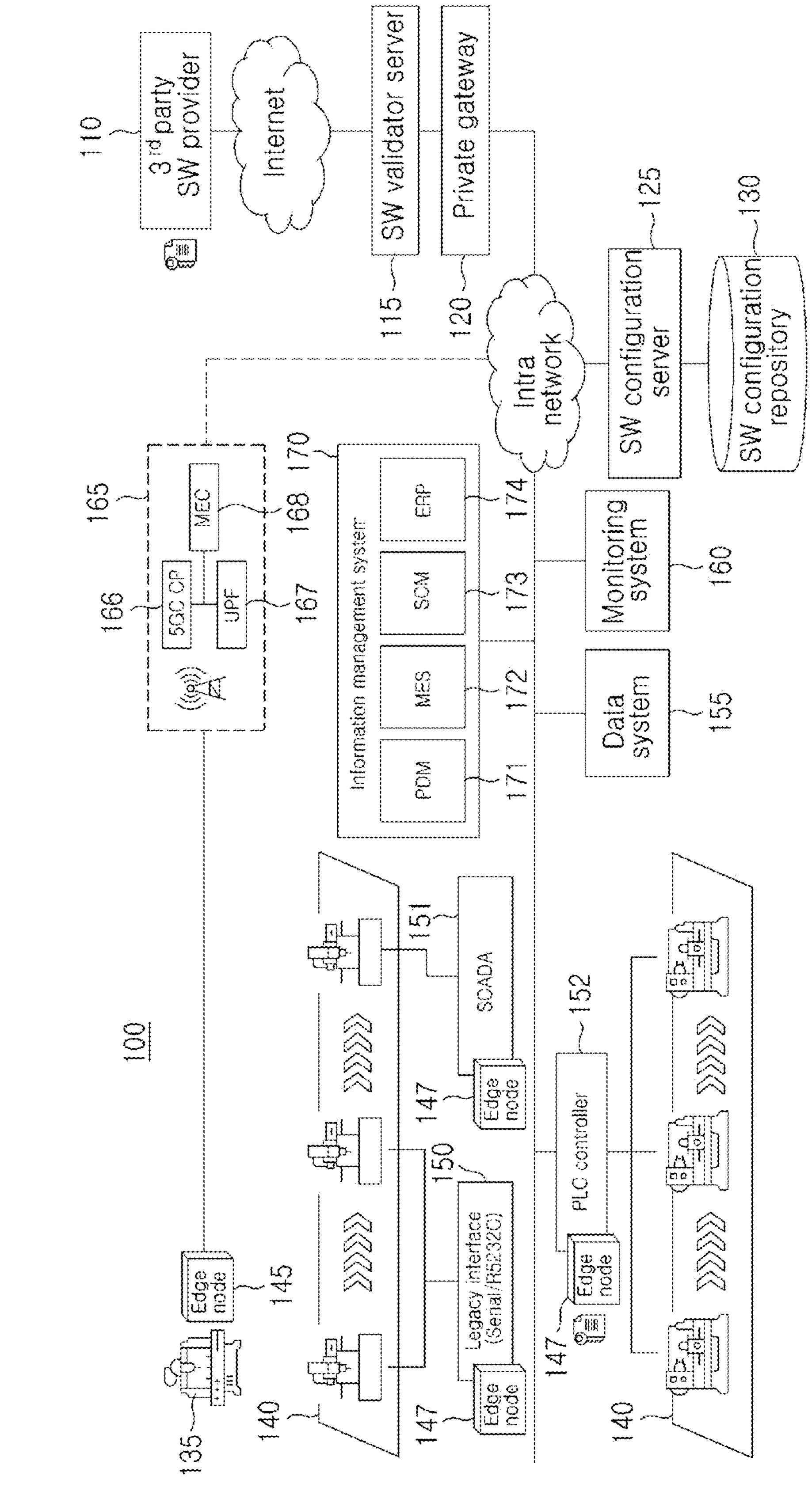
FIG. 1 is a diagram schematically illustrating a construction of a system for a manufacturing environment according to an embodiment of the present disclosure.

FIG. 1 is a diagram schematically illustrating a construction of a system 100 for a manufacturing environment according to an embodiment of the present disclosure.

Referring to FIG. 1, the system 100 for a manufacturing environment may include at least one of a 3$^{rd}$ party SW provider 110, a SW validator server 115, a private gateway 120, a SW configuration server 125, a SW configuration repository 130, non-connected manufacturing devices 135, connected manufacturing devices 140, edge nodes 145 and 147, legacy interfaces 150, SCADA 151, PLCs 152, a data system 155, a monitoring system 160, 5G networks 165, or information management systems 170.

The 3$^{rd}$ party SW provider 110 may indicate a company that supplies SW of a device that is used in a manufacturing environment. Alternatively, the 3$^{rd}$ party SW provider 110 may indicate a company that supplies essential SW for a production facility SW, such as a basic embedded SW management system and a PLC OS.

The SW validator server 115 may be responsible for the validation of SW in relation to an update or change of SW that is used in a manufacturing environment. Specifically, the SW validator server 115 provides roles, such as supplier identity proof and security checks for a SW update package, and may record and manage the person in charge who is responsible for the roles and related intruder information. Furthermore, the SW validator server 115 may provide a virtualization-based validation function through emulation after SW is autonomously downloaded. In this case, in order to provide various emulation environments, the SW validator server 115 may be connected an external emulation service or a cloud-based virtual operation environment. In a corresponding environment, SW may perform tests on an operation.

The private gateway 120 may provide a separate network demilitarized zone (DMZ) role for excluding a mutual connection between an intra-process network and an external Internet upon SW updates in a manufacturing environment. Furthermore, the private gateway 120 may be responsible for a role for providing an internal production process network with SW that is received from an external supplier. In this case, all of processes are monitored, and management based on records may be possible.

The SW configuration server 125 may provide a function for managing a SW configuration of a manufacturing and production facility. Specifically, the SW configuration server 125 may manage information, such as an OS for each device, the version of SW that is managed, an update method and interface, a credential information manager for updates, and an update date. In this case, whether SW received from an external supplier can be internally updated may be registered through the management of a SW configuration. Thereafter, the SW may be updated by stages in an actual process environment.

The SW configuration repository 130 may provide a repository role that stores SW management histories of manufacturing and production facility devices. Furthermore, the SW configuration repository 130 may perform a monitoring function on an arbitrary update and an intruder update by managing all of initial and update histories related to device SW. In this case, basic information may include various types of SW-related history information, such as public and commercial SW, another company's library, an operating system, firmware, and embedded SW. In particular, information that is stored and managed with respect to the SW history of equipment that is individually partially updated may be compatible with software bill of materials (SBOM) (SW material specifications) information. The SW configuration repository 130 may use a common database (DB) or may use blockchain that cannot be modified for safe history management.

The non-connected manufacturing devices 135 may indicate a production facility to which a network interoperation function is not provided, among production facilities that are managed in a manufacturing environment. If an autonomous data in/out interface is provided, the non-connected manufacturing devices 135 may manage device SW by connecting to the edge node 145.

The connected manufacturing devices 140 may indicate a production facility to which a network interoperation function is provided, among production facilities managed in a manufacturing environment. The connected manufacturing devices 140 may connect to the edge node 147 capable of accommodating various network interfaces because the connected manufacturing devices 140 can use the various network interfaces.

The edge nodes 145 and 147 are each a module that is connected to a manufacturing and production facility and performs an SW update, and may each have a unique ID for each device. The edge nodes 145 and 147 may each be a separate independent system capable of monitoring updated SW information and managing rights. Specifically, the edge nodes 145 and 147 may be connected to the SW configuration server 125, and may each monitor SW-related information of a device and provide a management function for a task, such as updates. In this case, the edge nodes 145 and 147 each needs to be accessed and controlled through separate authentication in order to guarantee the independent management of a corresponding device. The edge nodes 145 and 147 may include an edge node 145 having wireless connectivity and an edge node 147 having wired connectivity. The edge node 145 may connect Wi-Fi, 4G-based NB-IoT, or a 5G Private network depending on its function.

The legacy interfaces 150 may indicate network methods, such as RS232C, serial, a LAN, and a USB that are provided for the control and monitoring of manufacturing and production facility devices.

The SCADA 151 may indicate a SW and hardware system so that industry process control, real-time data monitoring, data collection and processing, a direct interaction with a production facility through HMI SW, and an event record on a log file can be performed locally or remotely.

The PLCs 152 may indicate an industrial computer control system that makes decision-making based on a user-designated program for continuously monitoring the state of an input device and controlling the state of an output device.

The data system 155 may manage raw data that is produced in a manufacturing and production facility. The data system 155 may be used in a smart factory, and may manage data in association with the manufacturing execution system (MES) of a company.

The monitoring system 160 may indicate a monitoring system in a manufacturing and production environment. The monitoring system 160 may operate normally regardless of whether the edge nodes 145 and 147 are used or not.

Although not illustrated, public cloud may indicate a service of a major cloud service provider that provides computing infrastructure. Private cloud may indicate a private cloud system that enables a company to autonomously manage data and a management service in a manufacturing environment.

The 5G network 165 may indicate a 4G/5G technology configured by a private network. In some embodiments, the 5G network 165 may include at least one of a 5G core control plane (5GC CP) 166, a user plane function (UPF) 167, or mobile edge computing (MEC) 168. The 5GC CP 166 may indicate a 5G core control unit. The UPF 167 may provide a packet transmission function, an external network connection function, a data usage collection and notification function, and a use report function for traffic billing. The MEC 168 may provide a function for performing computing, which is provided in a cloud for low latency/large capacity applications, at an edge close to user/thing/data source.

The information management system 170 may include at least one of product data management (PDM) 171, a manufacturing execution system (MES) 172, supply-chain management (SCM) 173, or enterprise resource planning (ERP) 174. The PDM 171 may centralize product-related data and process. The PDM 171 may track a change, manage a changed order, and generate and perform and BOM by using PDM SW. The MES 172 may indicate comprehensive and dynamic SW system that monitors, tracks, documents, and controls a process of manufacturing a product from a raw material to a finished product. The SCM 173 may manage a flow of a product from the procurement of a raw material to the delivery of a product to a final destination, goods related to a service, data, and finance. The ERP 174 may indicate one type of SW that is used to manage routine business activities, such as finance, personnel management, manufacturing, a supply network management, service, and procurement.

Figure 2:
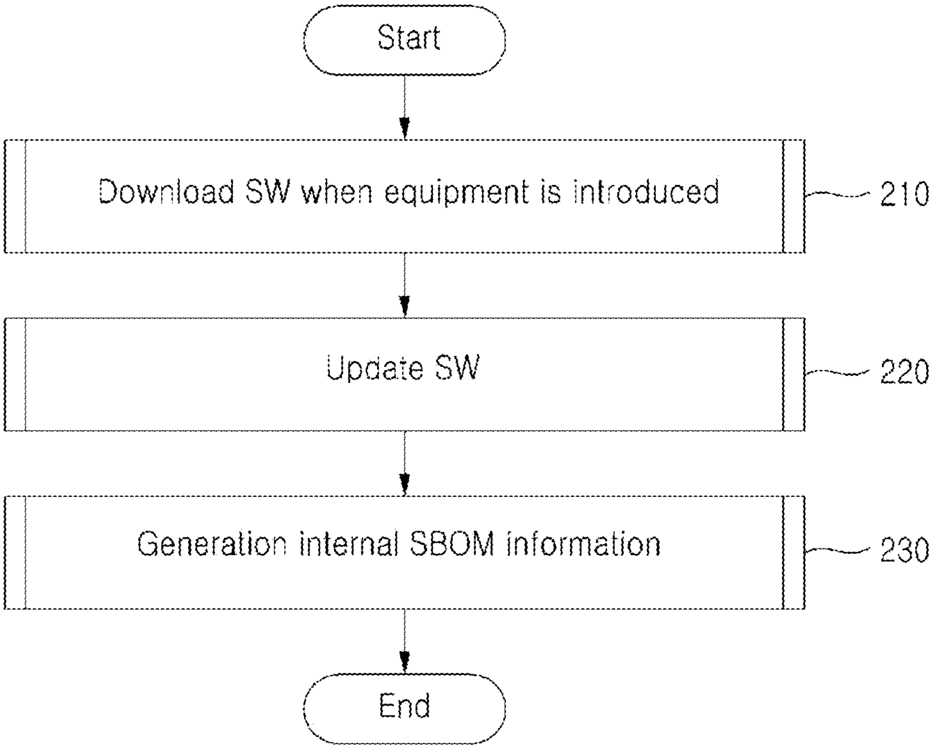
FIG. 2 is a diagram illustrating an operational procedure of the system for a manufacturing environment according to an embodiment of the present disclosure.

FIG. 2 is a diagram illustrating an operational procedure of the system 100 for a manufacturing environment according to an embodiment of the present disclosure.

Referring to FIG. 2, in step 210, the system 100 for a manufacturing environment may download SW of equipment when introducing the equipment. In this case, when introducing the equipment, the system 100 may download the SW from an equipment supply company while enabling authentication for a future SW update of the equipment supply company. This will be described more specifically late with reference to FIG. 3.

Figure 3:
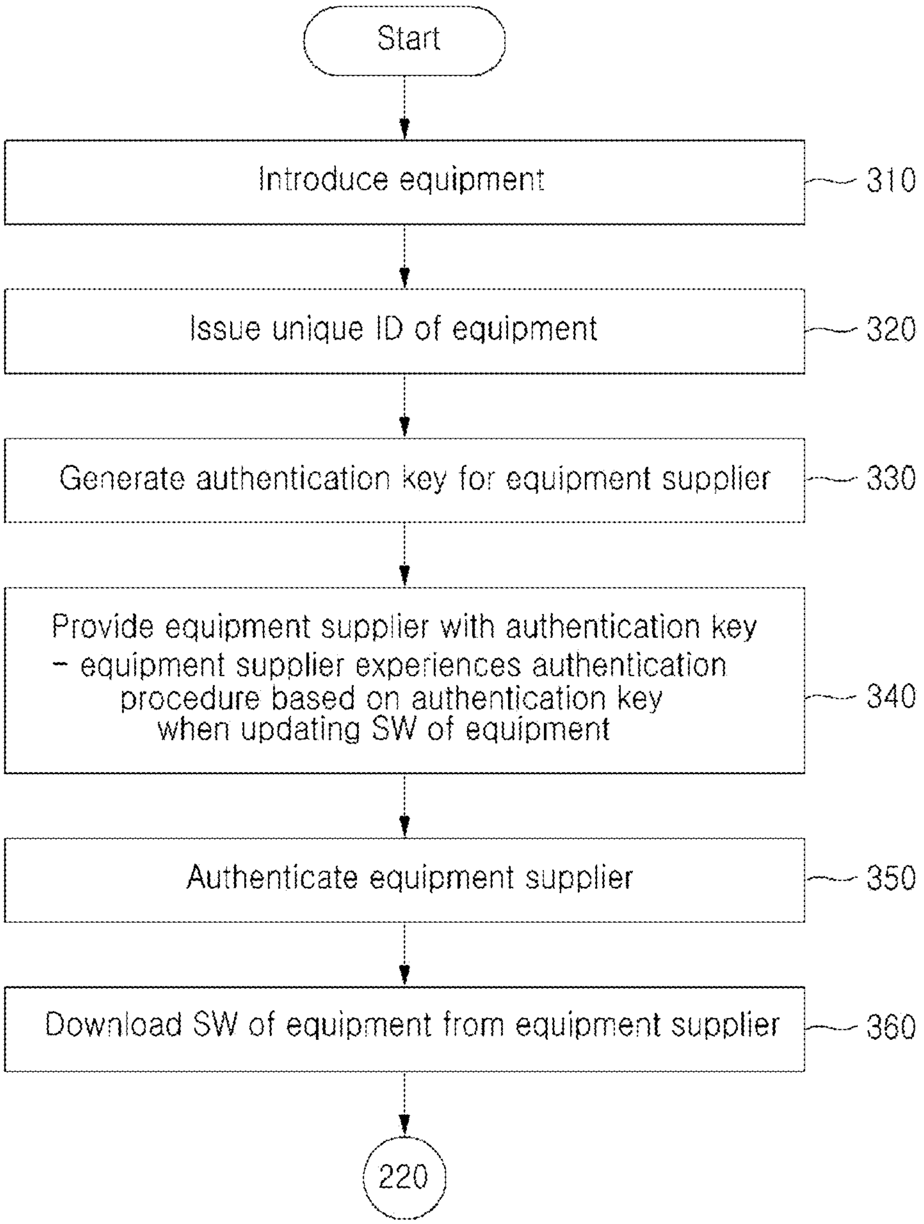
FIG. 3 is a diagram illustrating a procedure of downloading SW when equipment is introduced in FIG. 2.

FIG. 3 is a diagram illustrating the procedure (step 210) of downloading SW when equipment is introduced in FIG. 2.

Referring to FIG. 3, in step 310, the system 100 may determine the introduction of equipment into a manufacturing environment. Thereafter, in step 320, the system 100 may issue the unique ID of the equipment through the SW configuration server 125. In the case of equipment that uses the management of SW through the edge nodes 145 and 147, the unique ID of the equipment may be based on the unique ID of each of the edge nodes 145 and 147. In the case of equipment that does not use the management of SW through the edge nodes 145 and 147, the unique ID of the equipment may be arbitrarily generated by an equipment user or may be separately generated by an equipment user as a combination of information, such as the unique production ID of equipment.

Next, in step 330, the system 100 may generate an authentication key for an equipment supplier through the SW configuration server 125. Specifically, the system 100 may generate an authentication key for authentication when the SW of the equipment supplier is updated based on the unique ID of the equipment. In this case, if the same type of multiple pieces of equipment is supplied, an authentication key for an equipment supplier may be generated based on a representative ID. Thereafter, in step 340, the system 100 may provide the equipment supplier with the authentication key. Accordingly, when the equipment supplier updates the SW of the equipment, the equipment supplier may experience an authentication procedure based on the authentication key. Furthermore, the authentication key may be registered with the SW validator server 115.

Next, in step 350, the system 100 may authenticate the equipment supplier through the SW validator server 115. Specifically, the SW validator server 115 may review whether the equipment supplier performs authentication based on a previously issued authentication key, and may then determine whether the equipment supplier is a proper equipment supplier. Thereafter, in step 360, the system 100 may download the SW of the equipment from the equipment supplier through the SW validator server 115. In this case, when the authentication of the equipment supplier is successful, the system 100 may download the SW of the equipment. When the authentication of the equipment supplier fails, the system 100 cannot download the SW of the equipment. Thereafter, step 220 in FIG. 2 may be performed.

Referring back to FIG. 2, in step 220, the system 100 may update the SW of the equipment. This will be described more specifically with reference to FIG. 4.

Figure 4:
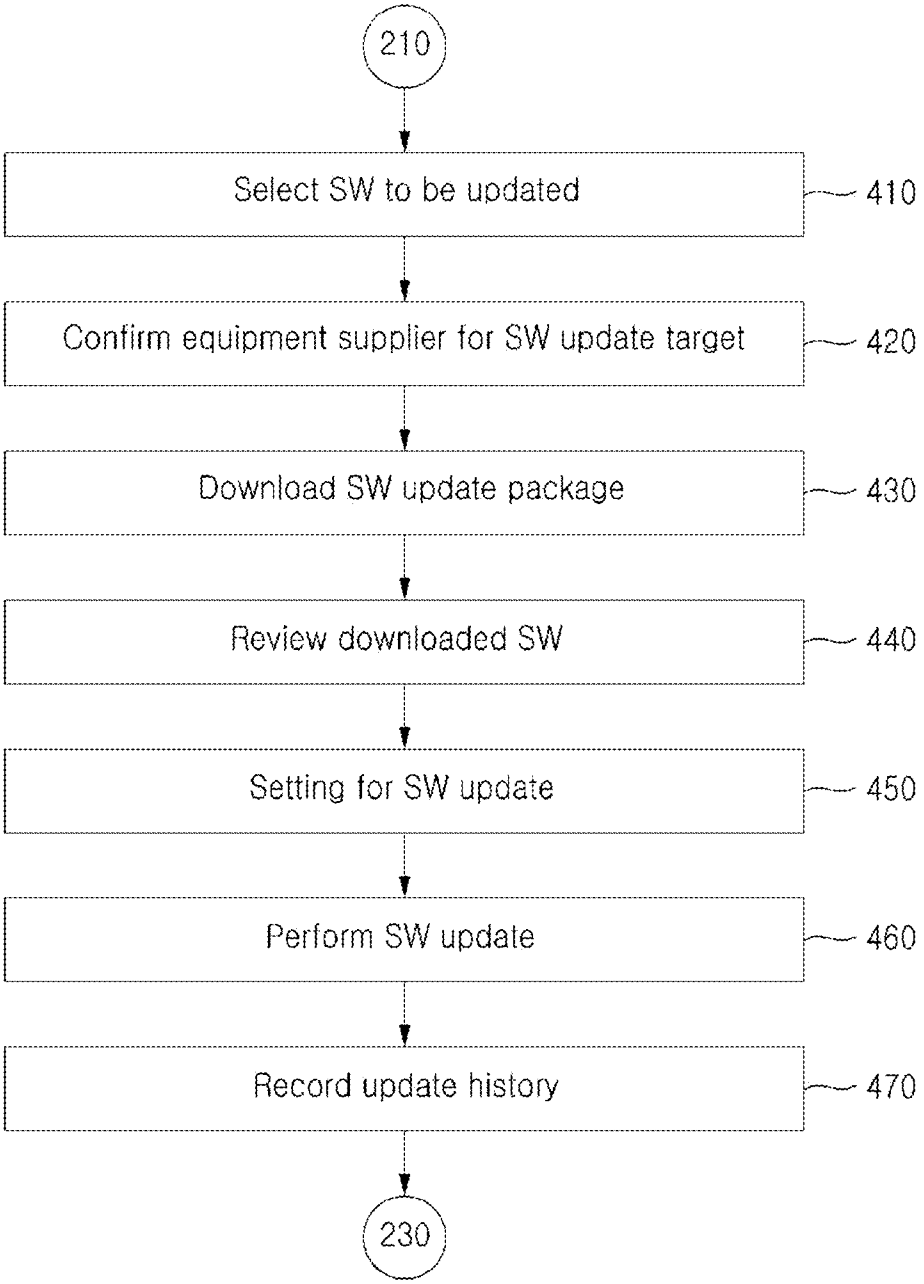
FIG. 4 is a diagram illustrating a procedure of updating SW in FIG. 2.

FIG. 4 is a diagram illustrating the procedure (step 220) of updating SW in FIG. 2.

Referring to FIG. 4, in step 410, the system 100 may select a SW update target. In this case, the system 100 may select a SW update target based on SW update information of the equipment that is internally managed. The SW update information may be confirmed through periodicity or the notification of the equipment supplier. Thereafter, in step 420, the system 100 may confirm the equipment supplier for the SW update target. In the case of an equipment supplier to which an authentication key has been issued, the system 100 may confirm the equipment supplier based on the authentication key. Information on the correct equipment supplier of SW may be confirmed by confirming unique SW information that is associated with original ID information of equipment that has been supplied to a manufacturing environment, in addition to common SW update information (e.g., a version of).

Next, in step 430, the system 100 may download the SW update package of the SW update target from the equipment supplier through the SW validator server 115. Thereafter, in step 440, the system 100 may review the downloaded SW. In the review task, a download integrity review, such as basic MD5, is performed, and SW management tests are then performed in a virtual environment. In this case, the review may be performed for a predetermined period in a form in which the SW is managed on a management platform virtualized in a digital twin form. Alternatively, the SW may be tested through a separate virtualized test emulation environment.

Next, in step 450, the system 100 may perform setting for a SW update. Specifically, after the downloaded SW is stably reviewed, the system 100 may move the SW to an internal SW management environment and set information for a SW configuration. In this case, the system 100 may perform a task, such as scheduling for updating the downloaded SW in an individual management environment, through the SW configuration server 125.

Next, in step 460, the system 100 may perform the SW update. When scheduling that has been set through the SW configuration server 125 is reached, the system 100 may be in an update preparation completion state. In this case, the system 100 may perform the SW update for each piece of equipment by stages so that there is no slippage in a production management time based on information for the SW configuration. Thereafter, in step 470, the system 100 may record an update history. When the SW update is completed for each piece of equipment in an online or offline form, the system 100 may record an update history through the SW configuration server 125, and may store and manage the update history through the SW configuration repository 130. In this case, update related information, such as an indicator, worker, update time, target equipment, and SW hash value of a corresponding task, may also be stored. Thereafter, step 230 in FIG. 2 may be performed.

Referring back to FIG. 2, in step 230, the system 100 may generate internal SBOM information. This will be described more specifically with reference to FIG. 5.

Figure 5:
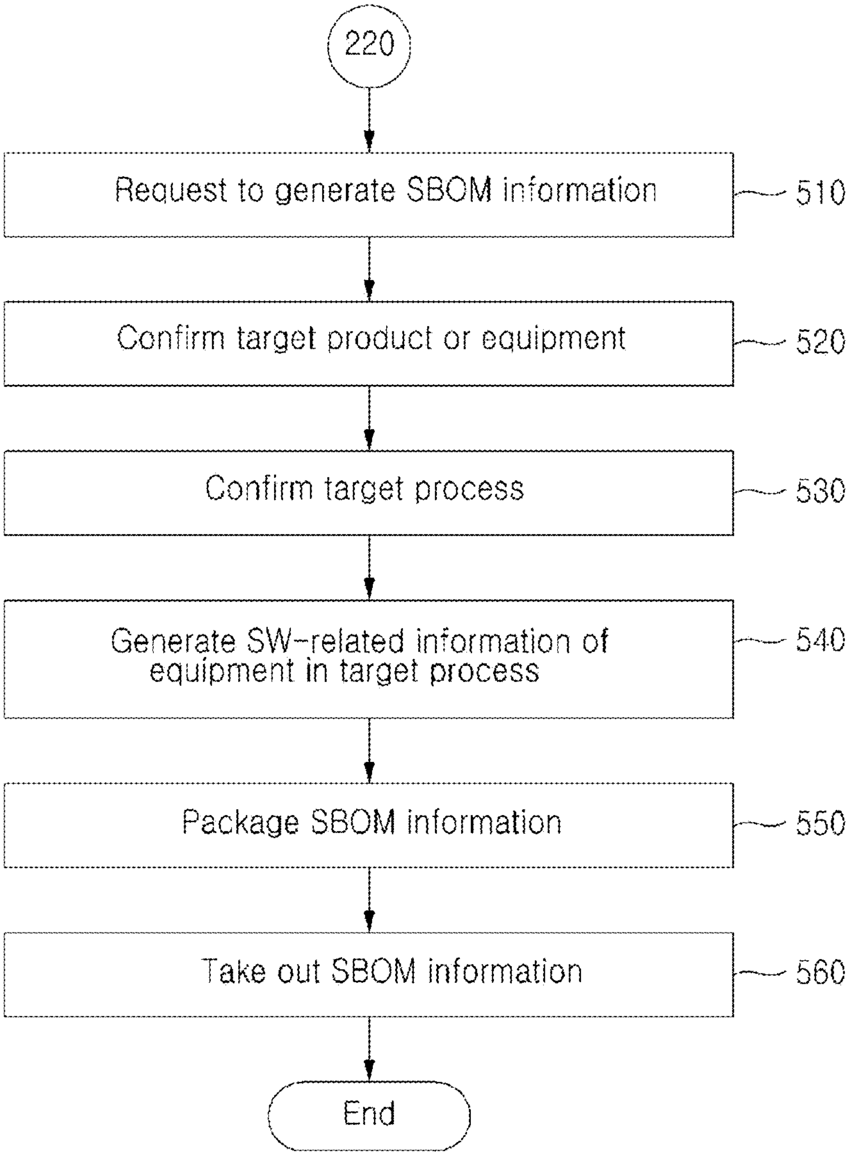
FIG. 5 is a diagram illustrating a procedure of generating internal SBOM information in FIG. 2.

FIG. 5 is a diagram illustrating the procedure (step 230) of generating internal SBOM information in FIG. 2.

Referring to FIG. 5, in step 510, the system 100 may receive an SBOM information generation request. Specifically, the system 100 may receive a SW-related SBOM generation request for a product that is being produced or equipment that is used for production. In response thereto, in step 520, the system 100 may confirm a target product or equipment. Specifically, the system 100 may confirm information on the product that is being produced or the equipment that is used for production, on ERP. In this case, detailed LOT information may be confirmed or BOM information may be confirmed due to the diversity of a supply line for each piece of production timing of a product that is being produced.

Next, in step 530, the system 100 may confirm a target process. Specifically, the system 100 may confirm a production process on the MES 172 or a series of pieces of equipment information that are input to a corresponding production process based on production information of a corresponding product. Thereafter, in step 540, the system 100 may generate information related to the SW of the equipment in the target process. In this case, the system 100 may request the information related to the SW of the equipment in the target process from the SW configuration repository 130.

Next, in step 550, the system 100 may package the SBOM information. That is, the system 100 may package the SBOM information based on collected SW-related information. Thereafter, in step 560, the system 100 may take out the SBOM information. In this case, the system 100 may take out the SBOM information in a separate desired format, if necessary.

As described above, embodiments of the present disclosure provide the function for monitoring a SW update process that is performed in a manufacturing environment and managing the SW update process. Specifically, embodiments of the present disclosure provide the function capable of managing the SW update history of a production facility in a manufacturing environment and controlling the SW update history in a sandbox form at the center when the SW update history is updated based on a network. Furthermore, in embodiments of the present disclosure, an edge node device is attached to various network interfaces included in a production facility so that the edge node device is separately installed, and monitors a process related to an SW update.

In embodiments of the present disclosure, when a SW update of specific equipment used in a production facility occurs, the production facility can be safely used against internal and external SW attacks by effectively managing workers and a SW update history (e.g., a data source or an update history) through the accurate management of a manufacturing environment. Furthermore, in embodiments of the present disclosure, it is expected that a producer can request compensation based on management and quality guarantee by checking a SW issue upon manufacturing and production based on objective monitoring in relation to the management of SW for a production facility in a manufacturing environment.

In other words, embodiments of the present disclosure provide the method and system 100 for managing SW of a manufacturing and production facility for an SBOM response.

In embodiments of the present disclosure, the method of managing SW of a manufacturing and production facility for an SBOM response, which is performed by the computer system 100, may include step 220 of managing a SW update history of the at least one piece of equipment 135 and 140 while monitoring the SW update of the equipment 135 and 140 within a manufacturing environment and step 230 of generating SBOM information based on the SW update history as a response to a request.

In embodiments of the present disclosure, the SW update may be individually performed on the equipment 135 and 140 by the at least one edge node 145 and 147 connected to the equipment 135 and 140, respectively, and may be monitored through the edge node 145 and 147.

In embodiments of the present disclosure, step 220 of managing the SW update history of the equipment 135 and 140 while monitoring the SW update of the equipment 135 and 140 may include step 410 of selecting SW to be updated, step 420 of confirming the supplier of the selected SW, step 430 of downloading the SW update package of the selected SW from the supplier, step 460 of updating the selected SW by using the SW update package, and step 470 of recording the update history of the selected SW.

In embodiments of the present disclosure, step 420 of confirming the supplier of the selected SW may include a step of confirming the supplier of the selected SW based on an authentication key corresponding to the equipment 135 and 140 of the selected SW.

In embodiments of the present disclosure, the method of managing SW of a manufacturing and production facility for an SBOM response may further include step 320 of issuing the unique ID of introduced equipment 135 and 140 when the equipment 135 and 140 from a supplier is introduced into a manufacturing environment (step 310), step 330 of generating an authentication key for the supplier based on the unique ID, step 340 of providing the supplier with the authentication key, and step 350 of authenticating the supplier based on the authentication key, and step 360 of downloading the SW of the introduced equipment 135 and 140 from the supplier.

In embodiments of the present disclosure, the authentication key may be used for the supplier to update the SW of the introduced equipment 135 and 140.

In embodiments of the present disclosure, the unique ID may be generated based on the unique ID of the edge node 145 and 147 when the edge node 145 and 147 is connected to the introduced equipment 135 and 140, and may be arbitrarily generated by a user or may be generated from the unique production ID of the introduced equipment 135 and 140 when the edge node 145 and 147 is not connected to the introduced equipment 135 and 140.

In embodiments of the present disclosure, the request may be a request for the SBOM information of a product that is produced in the manufacturing environment or at least one piece of equipment 135 and 140 selected within the manufacturing environment (step 510). Step 230 of generating the SBOM information may include step 520 of confirming at least one piece of equipment 135 and 140 that is used to produce the product in the manufacturing environment or the selected at least one piece of equipment 135 and 140, and step 550 of generating the SBOM information by packaging SW-related information including a SW update history of the used at least one piece of equipment 135 and 140 or the selected at least one piece of equipment 135 and 140.

In embodiments of the present disclosure, the computer system 100 for managing SW of a manufacturing and production facility for an SBOM response may include the SW configuration server 125 configured to manage the SW update history of the equipment 135 and 140 while monitoring the SW update of the at least one piece of equipment 135 and 140 within the manufacturing environment, and the SW configuration repository 130 configured to store the SW update history. The SW configuration server 125 may be configured to generate SBOM information based on the SW update history from the SW configuration repository 130 as a response to the request.

In embodiments of the present disclosure, the computer system 100 may further include at least one edge node 145 and 147 connected to the equipment 135 and 140, respectively. The SW update may be individually performed on the equipment 135 and 140 by the edge node 145 and 147, and may be monitored through the edge node 145 and 147.

In embodiments of the present disclosure, the SW configuration server 125 may be configured to select SW to be updated, confirm the supplier of the selected SW, download the SW update package of the selected SW from the supplier, update the selected SW by using the SW update package, and record the update history of the selected SW.

In embodiments of the present disclosure, the SW configuration server 125 may be configured to confirm the supplier of the selected SW based on an authentication key corresponding to the equipment 135 and 140 of the selected SW.

In embodiments of the present disclosure, the SW configuration server 125 may be configured to issue the unique ID of introduced equipment 135 and 140 when the equipment 135 and 140 from the supplier is introduced into the manufacturing environment, generate an authentication key for the supplier based on the unique ID, provide the supplier with the authentication key, and download the SW of the introduced equipment 135 and 140 from the supplier by authenticating the supplier based on the authentication key. The authentication key may be used for the supplier to update the SW of the introduced equipment 135 and 140.

In embodiments of the present disclosure, the unique ID may be generated based on the unique ID of the edge node 145 and 147 when the edge node 145 and 147 is connected to the introduced equipment 135 and 140, and may be arbitrarily generated by a user or may be generated from the unique production ID of the introduced equipment 135 and 140 when the edge node 145 and 147 is not connected to the introduced equipment 135 and 140.

In embodiments of the present disclosure, the request may be a request for the SBOM information of a product that is produced in the manufacturing environment or at least one piece of equipment 135 and 140 selected within the manufacturing environment. The SW configuration server 125 may be configured to confirm at least one piece of equipment 135 and 140 that is used to produce the product within the manufacturing environment or the selected at least one piece of equipment 135 and 140 and to generate the SBOM information by packaging SW-related information including the SW update history of the used at least one piece of equipment 135 and 140 or the selected at least one piece of equipment 135 and 140.

Hereinafter, the present disclosure provides a method of monitoring the current status of data-based production and a system for AI analysis.

Embodiments of the present disclosure relate to a technology for monitoring the current status of production based on data collected in a production process and analyzing a production process through an AI model.

A process management system according to embodiments of the present disclosure may be implemented with at least one computer device. A method of monitoring the current status of production according to embodiments of the present disclosure may be performed through at least one computer device included in the process management system. In this case, a computer program according to an embodiment of the present disclosure may be installed and driven in the computer device. The computer device may perform the method of monitoring the current status of production according to embodiments of the present disclosure under the control of the driven computer program. The computer program may be stored in a computer-readable recording medium in order to be combined with the computer device and to execute the method of monitoring the current status of production in a computer.

Figure 6:
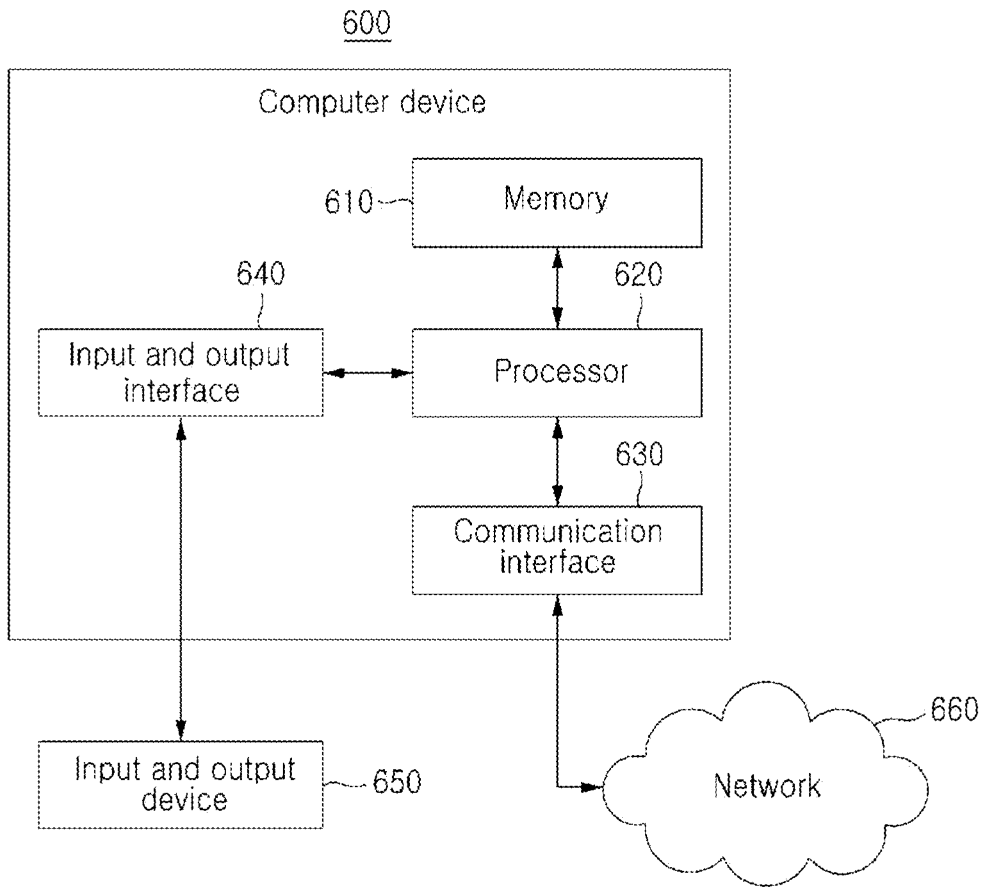
FIG. 6 is a block diagram for describing an example of the internal components of a computer device in an embodiment.

FIG. 6 is a block diagram for describing an example of the internal components of a computer device in an embodiment. For example, a process management system according to embodiments of the present disclosure may be implemented with a computer device 600 illustrated in FIG. 6.

As illustrated in FIG. 6, the computer device 600 may include memory 610, a processor 620, a communication interface 630, and an input and output interface 640 as components for executing the method of monitoring the current status of production according to embodiments of the present disclosure.

The memory 610 is a computer-readable recording medium, and may include random access memory (RAM), read only memory (ROM), and permanent mass storage devices, such as a disk drive. In this case, ROM and permanent mass storage devices, such as a disk drive, is a separate permanent storage device that is different from the memory 610, and may be included in the computer device 600. Furthermore, an operating system and at least one program code may be stored in the memory 610. Such software components may be loaded from a computer-readable recording medium that is different from the memory 610 onto the memory 610. Such a separate computer-readable recording medium may include computer-readable recording media, such as a floppy drive, a disk, a tape, a DVD/CD-ROM drive, and a memory card. In another embodiment, the software components may be loaded onto the memory 610 through the communication interface 630 not a computer-readable recording medium. For example, the software components may be loaded onto the memory 610 of the computer device 600 based on a computer program that is installed by files that are received over a network 660.

The processor 620 may be configured to process an instruction of a computer program by performing basic arithmetic, logic, and input/output (I/O) operations. The instructions may be provided to the processor 620 by the memory 610 or the communication interface 630. For example, the processor 620 may be configured to execute received instructions based on a program code that has been stored in a recording device, such as the memory 610.

The communication interface 630 may provide a function for enabling the computer device 600 to communicate with another computer device over the network 660. For example, a request, an instruction, data, or a file that is generated by the processor 620 of the computer device 600 based on a program code that has been stored in a recording device, such as the memory 610, may be transferred to other computer devices over the network 660 under the control of the communication interface 630. Inversely, a signal, an instruction, data, or a file from another computer device may be received by the computer device 600 through the communication interface 630 of the computer device 600 over the network 660. A signal, an instruction, a file that is received through the communication interface 630 may be transmitted to the processor 620 or the memory 610. A file that is received through the communication interface 630 may be stored in a storage medium (e.g., the permanent storage device) which may be further included in the computer device 600.

The communication method is not limited, and may include short-distance wired/wireless communication between devices, in addition to communication methods using communication networks (e.g., a mobile communication network, wired Internet, wireless Internet, and a broadcasting network) which may be included in the network 660. For example, the network 660 may include one or more arbitrary networks of a personal area network (PAN), a local area network (LAN), a campus area network (CAN), a metropolitan area network (MAN), a wide area network (WAN), a broadband network (BBN), and the Internet. Furthermore, the network 660 may include one or more of network topologies, including a bus network, a star network, a ring network, a mesh network, a star-bus network, and a tree or hierarchical network, but is not limited thereto.

The input and output interface 640 may be means for an interface with an input and output device 650. For example, the input device may include a device, such as a microphone, a keyboard, a camera, or a mouse. The output device may include a device, such as a display or a speaker. Furthermore, for example, the input and output interface 640 may be means for an interface with a device in which functions for an input and an output have been integrated into one, such as a touch screen. The input and output device 650, together with the computer device 600, may be configured as a single device.

Furthermore, in other embodiments, the computer device 600 may include components greater or smaller than the components of FIG. 6. However, it is not necessary to clearly illustrate most of conventional components. For example, the computer device 600 may be implemented to include at least some of the I/O devices 650 or may further include other components, such as a transceiver, a camera, various sensors, and a database.

Hereinafter, detailed embodiments of a method and system for monitoring the current status of production based on data collected in a production processing process and analyzing a production process based on collected process data by using an AI model are described.

Figure 7:
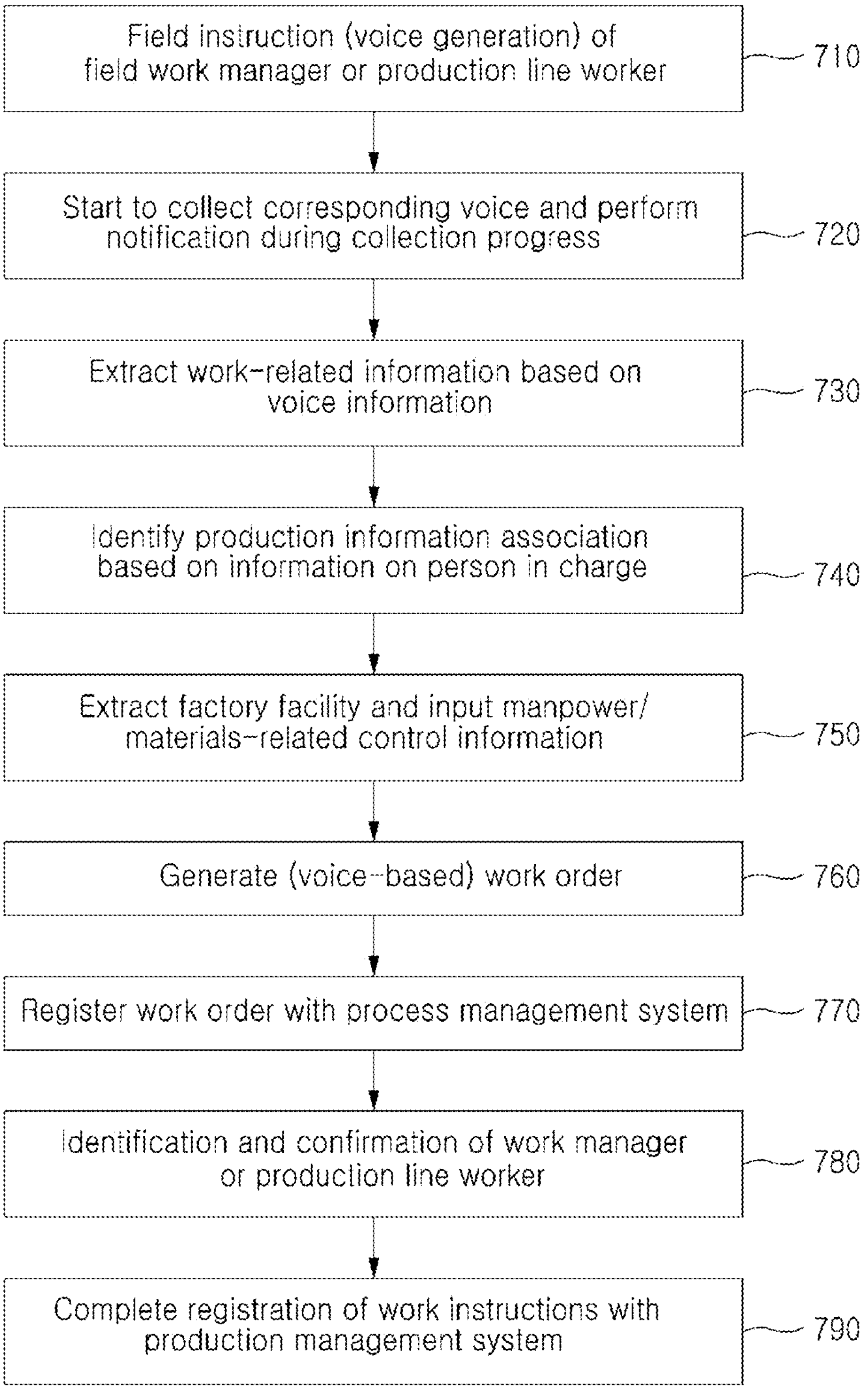
FIG. 7 is a diagram for describing an operation process of a reader module in an embodiment.

FIG. 7 is a diagram for describing an operation process of a reader module in an embodiment.

A reader module may collect a field instruction of field work manager or a production line worker in a situation, such as regular meeting before work or meeting during work (710). Accordingly, voice information may be generated. In this case, users may request voice recognition in order to explicitly generate a conversation content-based work instruction, or voice information may be automatically collected by recognizing voice when two or more persons perform conversations on the spot. For example, when the name of a worker is called or when a work-related instruction is performed at a specific point (e.g., recognizable by a camera at a specific location in a recognizable production process), voice information may be collected.

The reader module may start to collect voice information related to the collected field instruction and perform notification during the collection progress (720). When voice-based conversations are performed between workers or managers, the conversations are collected in real time, and a separate alarm service may be provided in order to provide whether the conversations are collected to a user and a counterpart. If a user uses a wireless device, the wireless device needs to be provided with a separate LED that is recognizable by a counterpart. The wireless device may have a system configuration having a form in which the wireless device is connected to a safety hat or may have a construction having a separate necklace form. Furthermore, if a voice-based work command is performed at a specific location, a user may be notified of sound or image recording through a separate light installed at the specific location.

The reader module may extract work-related information based on the collected voice information (730). The reader module may extract work-related information based on voice information that is collected on the spot. Speaker separation needs to be performed. Information of each speaker may be matched with input manpower information in an HR system and a production information system, and may be used to identify a production-related position and an assigned task.

The reader module may identify production information association based on information on a person in charge (740). The reader module may perform a procedure of identifying whether the extracted work-related information based on voice corresponds to an actual production work-related instruction in association with information of a process in which an actual person in charge or a current person in charge is placed. In this case, input materials, process input equipment, a related person in charge, and final product information may be included in corresponding production information. When association with production information is low, corresponding information may be excluded from a work-related information instruction.

The reader module may extract factory facility and input materials-related control information (750). Process facility-related control-related information, input manpower, and materials-related control information, that is, major information that directly affects actual production, among pieces of voice information between users, may be separately extracted and constructed as basic data for generating a work order. In this case, pieces of related information need to be connected to systems, such as an MES/SCM/ERP, so that code data not an accurate name can be recognized.

The reader module may generate a voice-based work order (760). The reader module may generate a work order based on the collected voice information. The reader module generates the work order by separating speakers based on contents related to work. If the existing template is present, the reader module may generate contents that are automatically matched with a format, by connecting an input STT with a work order prompt by using AI.

The reader module may register the work order with the process management system (770). Generated work instructions are temporarily registered with the process management system based on corresponding worker information. If a device, such as a smartphone or a tablet, or a device, such as AR glass, which is used on the spot, is present, it may be notified that process-related work instructions are registered with a corresponding device.

The reader module may perform the identification and confirmation of a work manager or a production line worker (780). Generated work manager information may experience the identification and confirmation process of a producer or a user who has authority. If work instructions for multiple persons are performed, all of users, that is, corresponding instruction targets, may confirm the work instructions depending on setting. Alternatively, whether to confirm and perform a corresponding work instruction may be determined by determining a rule, such as that a predetermined ratio of users confirm the work instructions. After the work instructions are registered, if the work instructions are shared through a separate work sharing check system or window for a predetermined time, the work instructions may be automatically confirmed.

The reader module may complete the registration of the work instructions with the production management system (790). If a work manager or a production line input person identifies and confirms the work instructions, corresponding contents may be registered as work instructions of the production management system. Information registered with the production management system may be used in the analysis of a production process in the future. In particular, a production process can be analyzed more precisely because information that is conventionally difficult to collect like a verbal instruction is collected.

Figure 8:
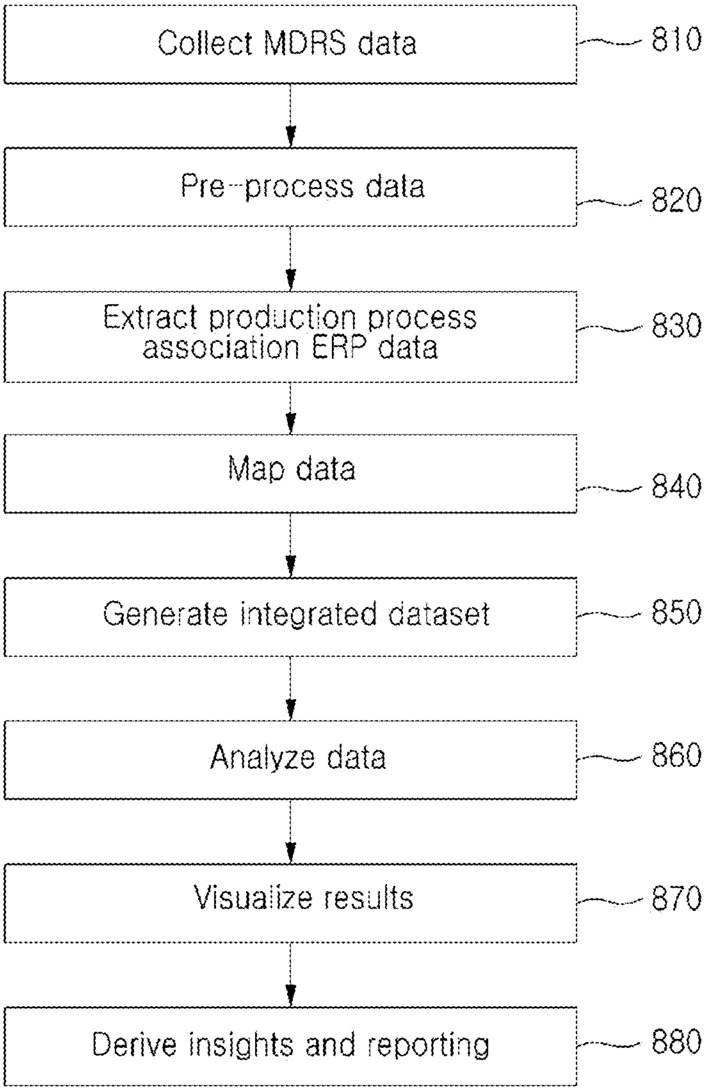
FIG. 8 is a diagram for describing a process of analyzing the raw data of production process equipment by associating the raw data with a work center of SAP in an embodiment.

FIG. 8 is a diagram for describing a process of analyzing the raw data of production process equipment by associating the raw data with a work center of SAP in an embodiment.

In step 810, the processor may collect equipment data. The processor may collect raw data in real time through a sensor and an IoT device that are installed in each of pieces of equipment of the production management system in a production process. The collected equipment data may include production quantity, an operation time, energy consumption, and a quality-related index.

In step 820, the processor may pre-process the collected equipment data. The processor may refine and standardize the collected equipment data (i.e., raw data). For example, the processor may perform tasks, such as the removal of outliers, the processing of missing values, and the unification of a data format. Furthermore, the processor may check the time synchronization of data, and may adjust the time synchronization if necessary.

In step 830, the processor may extract production process association ERP data. The processor may extract SAP work center data. The processor may obtain information, such as a work order, a production plan, material information, and the deployment of manpower, by extracting the data of a related work center in the SAP system. Required data are loaded by using an SAP API or a data extraction tool, which is for identifying and using association between data collected in equipment and the data of the SAP work center.

In step 840, the processor may map the data. The processor may map the data based on a common key value (e.g., a facility ID or a work order number). Alternatively, the processor may connect (production)-related data at the same timing through time-based mapping.

In step 850, the processor may generate an integrated dataset. The processor may generate the integrated dataset based on the mapped data and use the integrated dataset in the analysis of AI in the future.

In step 860, the processor may store the data by using a relational database or a big data platform, may perform the consistency and integrity of the data, and may perform data analysis by using data analysis, statistical analysis, and a machine learning algorithm. The processor may calculate a productivity index, quality correlation, and equipment efficiency, and may construct a prediction model in order to predict future performance.

In step 870, the processor may visualize the results of the analysis. The visualization means that the results of the analysis are visualized in the form of a dashboard, a graph, or chart. The results of the analysis may be accessed in a form in which major KPIs are indicated by constructing a real-time monitoring system. The processor may provide the results through a user-friendly interface.

In step 880, the processor may derive insights based on the visualized results of the analysis and report the insights. The processor may derive actionable insights based on the results of the analysis. The processor may write proposals for productivity improvement, quality improvement, and a cost reduction, may submit a report to a department related to board of directors, and may perform presentation, if necessary.

Figure 9:
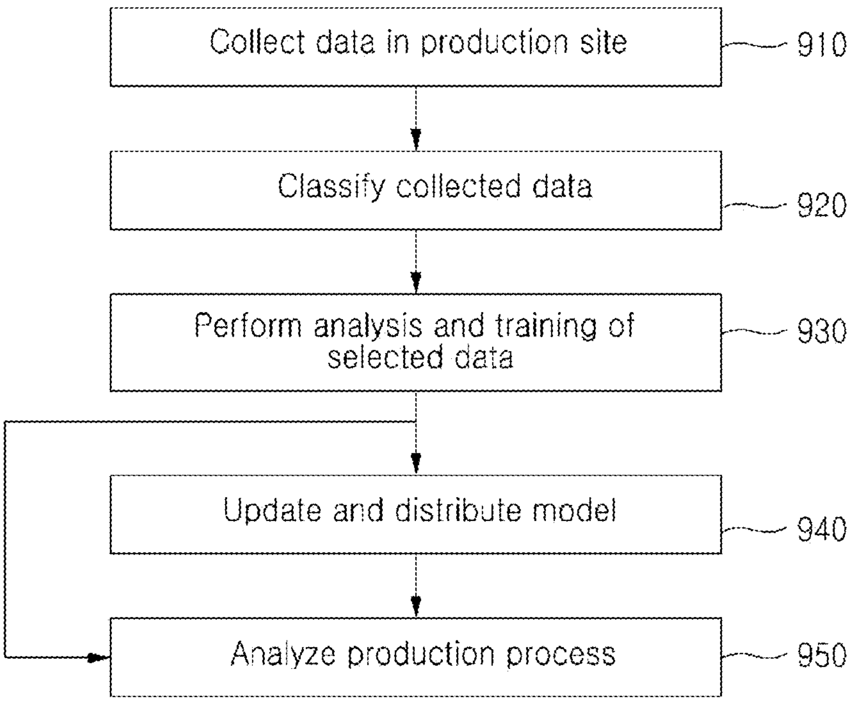
FIG. 9 is a diagram for describing a process of analyzing a production process based on AI in an embodiment.

FIG. 9 is a diagram for describing a process of analyzing a production process based on AI in an embodiment.

In step 910, the processor may collect data in a production site. The collection of the data in the production site may be consistently performed at timing at which pieces of production equipment operate. However, whether to collect information may be selectively performed depending on a product in a production process and the setting of a production process. For example, a production process is constructed and operated for each specific date, production feature information at a corresponding date needs to be associated with production site data.

In step 920, the processor may classify the collected data. In this case, the collected data may be classified based on process information for each production product. A criterion for classifying the data may include classifying the data based on the type of production product, a process step, an operation cycle for each equipment, and maintenance and repair records. As in the determination of a prenotion and preservation cycle of individual equipment, the features of a process for each production product are different in addition to information simply based on an operation time and an operation form of corresponding equipment is different. Accordingly, the collected data need to be classified in association with process information for each production product. Furthermore, if there is a request for separate data training, the collected data may be separately classified.

In step 930, the processor may perform the analysis and training of selected data. If the existing AI model or analysis methodology for data that are collected and classified based on a production process is present, the data may be analyzed. An analysis method which may be commonly used includes the detection of abnormality through time-series analysis and the analysis of a cyclic pattern. If a related process newly operates, corresponding data may be connected to a data pipeline for separate model training.

In step 940, the processor may update and distribute a model. In the training cycle of the model, the model may operate in association with product production information (e.g., a total production quantity) or may be set by considering an operation time of a manufacturing process facility. Alternatively, if predetermined data are collected based on the collection quantity of data, measures, such as the update of the model, may be taken based on the number of operations of a corresponding device.

In step 950, the processor may perform production process analysis work by using an AI model. If the existing model is used or new analysis is to be performed, a separate AI model or AI analysis methodology may be applied. A production manager may check problems or improvements based on production process analysis information, and may incorporate the problems or improvements in work instructions or determinations in the future. That is, if a productivity reduction or an abnormal situation is detected, measures, such as sending alarm to a manager, may be taken in real time. A notification method may be supported variously like e-mail, SMS, a mobile app, and a screen panel of a production device.

Figure 10:
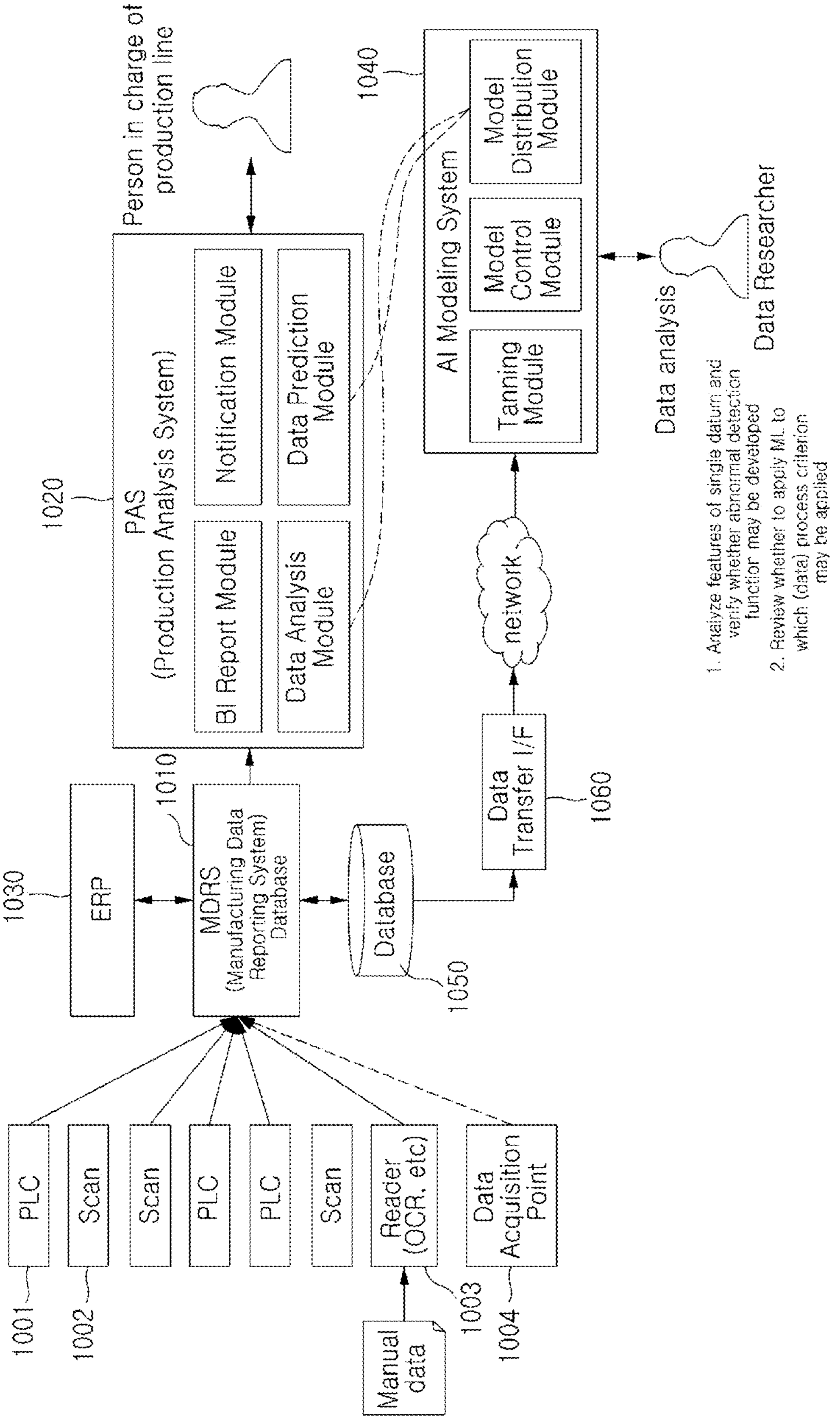
FIG. 10 is a diagram for describing system architecture in an embodiment.

FIG. 10 is a diagram for describing system architecture in an embodiment.

A PLC 1001 provides a role of collecting information of a production facility that is controlled by a programmable logic controller. Individual PLC information is structured in an ID form. Corresponding information is connected to a production process control system, such as an MES and ERP. A production process to which corresponding information has been input at operation timing and product LOT ID corresponding to information at corresponding production timing may be checked. Accordingly, whether there is a problem in a product at specific production timing can be effectively determined in a specific production process at data analysis timing in the future (e.g., when a failure report from a customer is analyzed or upon recall processing).

A scan/scanner 1002 refers to pieces of scan equipment that monitor a production process line, and plays a role of monitoring the progress speed and state of production.

A reader 1003 plays a role of collecting data, such as a document-based job sheet or a note having an atypical and analog format which is used in the existing production environment. In the existing production process line, after verbal discussion before the start of work, a work instruction is transferred or the transfer of work having a simple note form is still frequent. Such information has a great influence on the management of a production process, but is rarely collected as data, which causes confusion in a production-related data-based analysis step. Reader can recognize and separately database contents related to work information based on NLP even with respect to voice-based work instruction information in addition to a document form.

A data acquisition point 1004 refers to a point at which data are obtained in a process environment. Data may be obtained by using a system or device having various forms. The data may include motion information (e.g., a camera-based image or sensing) of a work manager or voice information (e.g., conversation information on the spot), if necessary.

A manufacturing data reporting system (MDRS) 1010 is a system that generates production-related reporting based on data collected in an actual process. The MDRS 1010 may be divided into a data collection unit, a data processing unit, and a data storage unit. The data collection unit plays a role of collecting various data collected in a production process, and collects data through cooperation with network interfaces of various production facilities, such as a PLC and SCADA. The data processing unit performs pre-processing for classifying and storing collected data, and provides a function capable of managing data in a raw data level, if necessary. The data storage unit plays a role of storing collected data, and may be constructed in various forms, such as time-series data and image data, depending the features of data.

A database 1050 refers to a repository that stores data collected in a production process. The database 1050 may store various data formats necessary for the monitoring and management of a production process. Accordingly, the database may cooperate by selecting a suitable data storage structure. For example, the database 1050 may collect, manage, and store time-series data. Furthermore, the database may use file storage without essentially using a database system based on the features of data.

A data transfer interface (I/F) 1060 provides a function having a role of taking out data collected in a production process through cooperation with an internal or external analysis system. Data collected in a production process may be directly connected to a production system, and thus work, such as analysis and training, needs to be performed on the data in a separate system. To this end, the data transfer I/F is responsible for a role of taking out data so that the data can be processed in connection with a separate system or an external on-premise or cloud system within the same work site. In this case, a condition for the taking-out needs to be approved. In this case, a rule or regulation for a separate approval procedure, privacy, or data protection needs to be fulfilled. Furthermore, separate monitoring needs to be possible for an external taking-out history.

An AI modeling system 1040 is a system that consistently trains, generates, and manages an AI model based on data collected through the MDRS 1010. In general, the AI modeling system is constructed as a separate system, and plays a role of improving an AI model. AI research performs work, such as the training and improvement of a model through a corresponding system.

The AI modeling system 1040 may include a training module, a model control module, and a model distribution module. The training module is responsible for the training of the existing model or a new model based on collected data. The training model may determine whether to store or delete trained data, if necessary. The model control module may operate and manage various models in a subdivided form based on the properties of a production process. The model control module plays a role of managing model information in order to support such a function. The model distribution module performs a function that manages the update or distribution of a trained model. The management of the lifecycle of an AI model for the management of a production process may also be performed by using the model distribution module.

A production analysis system (PAS) 1020 is a system that enables the influence of process data, which are collected in a production process, on actual productivity and the results of the influence to be comprehensively determined by analyzing the process data. The production analysis system analyzes an actual production quantity and time and input resources (e.g., materials and manpower) for each production situation, and support a production process to be effectively improved based on such data in the future. The production analysis system 1020 may consist of a BI report module, a notification module, a data analysis module, and a data prediction module.

The BI report module provides a function that visualizes business decision-making so that the business decision-making can be easily made through the analysis of a production process. As in the existing reporting tool, the BI report module may provide an optimal visualization scheme by connecting data according to a predetermined template or connecting a visualization tool suitable for the properties of results derived through AI analysis.

The notification module performs a function that transfers information related to a case in which a direct instruction needs to be performed on workers or managers in a production line based on results obtained through production analysis (e.g., an increase of an error rate or the acceleration and deceleration of a production speed). The notification module may transfer a related message over a separate independent network that is connected to individual production process equipment, in addition to a function that transfers a message to the device of a worker over a common network. In this case, the corresponding message may be selectively exposed to related workers in association with setting information of a production line, priority information of a message, and information on a related person in charge.

The data analysis module is a module that analyzes data collected in a production process, and may analyze production process data by using a well-known algorithm according to methodology, such as an AI model that has already been trained or AutoML. Corresponding information may be used to analyze a production process through pre-training because a common production process has hybrid production and periodicity (e.g., a seasonal appliance product has a year-round production concentration cycle). If the same material (e.g., a case, such as plastic injection) is additionally used in another product, the data analysis module may compare production-related information based on such information. An AI model is updated through the AI modeling system 1040 through additional training according to consistent production. The updated AI model may be distributed through the model distribution module.

The data prediction module may perform prediction related to a production process by using the results of analysis obtained by analyzing the production process based on data collected in the production process.

Figure 11:
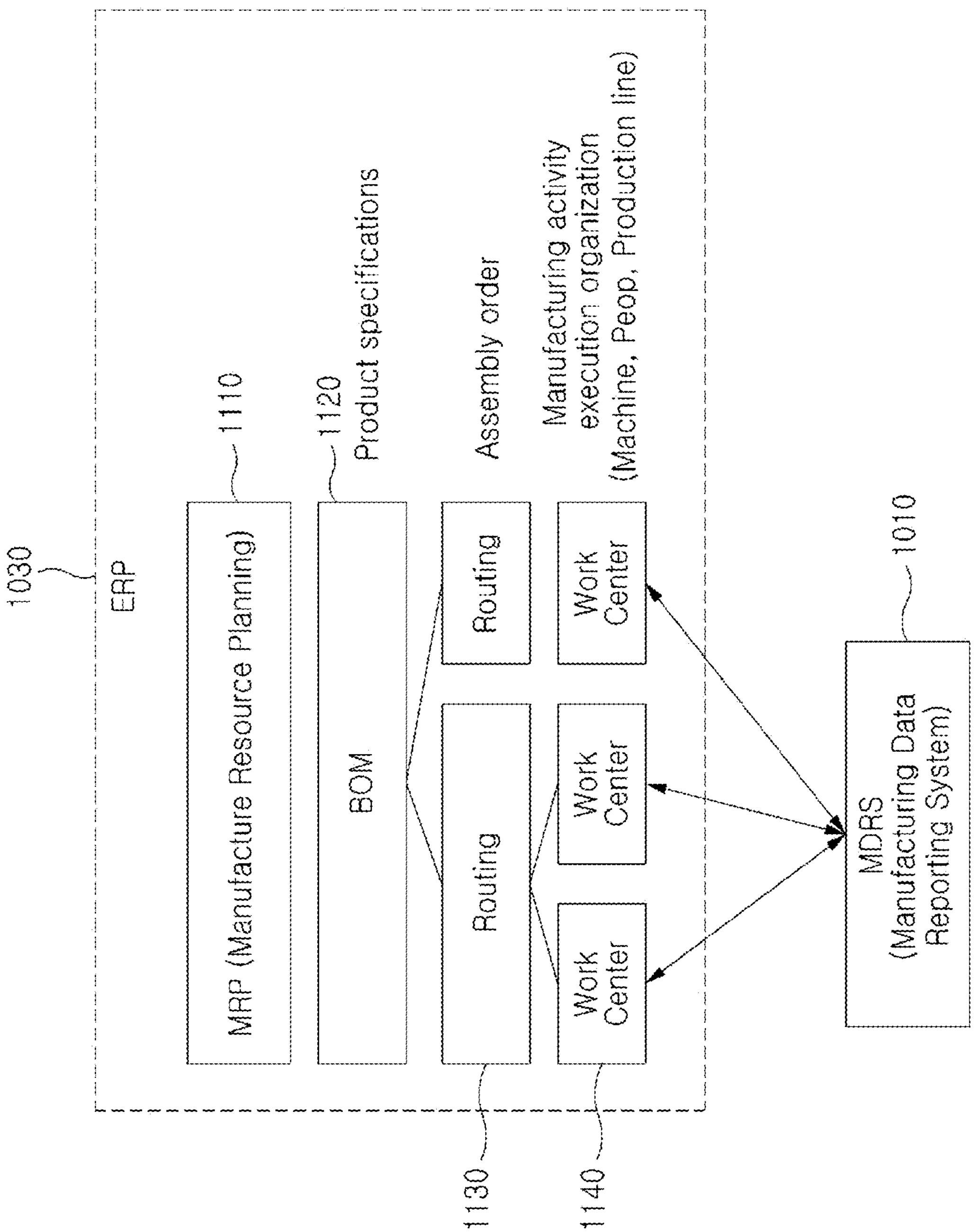
FIG. 11 is a diagram for describing system architecture based on ERP association in an embodiment.

FIG. 11 is a diagram for describing system architecture based on ERP association in an embodiment.

The management of a manufacturing process in the enterprise ERP system may be constructed as illustrated in FIG. 11. Information of corresponding modules is connected to the MDRS 1010, and may be managed in association with information of input resources in addition to product information planned in an actual production line. Such information is analyzed through a production analysis system so that input resources versus production efficiency can be measured.

Manufacture resource planning (MRP) 1120 is a system designed to plan manufacturing production. The MRP identifies required materials, estimates a quantity, determines timing at which materials are required in order to satisfy a production schedule, and manages the time of delivery. A target of the MRP is to satisfy a demand and improve overall productivity.

A bill of material (BOM) 1120 refers to information that is used when a product is produced or when a cost is calculated because the information contains all of pieces of information, such as a part quantity unit for materials.

Routing 1130 refers to a work list that defines an order in which a manufacturing product is manufactured or assembled. Furthermore, the routing may also include other steps, such as hold, hold, discard, or another process sequence. The process sequence may be used for a schedule plan and production for cost calculation work in addition to the calculation of a standard cost for a complete product.

A work center 1140 refers to an organization unit on which an operation is performed for each detailed work. The work center is matched with the input resources of a production process. A machine, people, and a production line are managed in an organization unit in the work center. The work center is influenced by a cost center according to activities through association with the ERP 1030. The work center has a corresponding proper production capability.

The MDRS 1010 is a system that generates production-related reporting based on data collected in an actual process, and operates in conjunction with the work centers so that the MDRS can check a production plan versus results thereof.

Accordingly, the present disclosure may achieve the following effects. Inefficiency in a production line can be instantly detected and handled (real-time data collection and analysis) because data are collected and analyzed in real time in all of steps of a production process. An equipment failure can be predicted in advance and prevented (predictive maintenance and repair) because operation data of equipment is consistently monitored and analyzed through an AI algorithm. The abnormality of quality can be early detected and handled (quality management optimization) because quality-related data generated in a production process is collected in real time and subjected to AI-based analysis. Energy efficiency of the entire production process can be improved (energy efficiency improvement) because energy consumption data for each equipment are collected and an optimal energy use pattern is derived through AI-based analysis. A production quantity can be increased and a due date compliance rate can be improved (production plan optimization) because an optimal production plan is established by analyzing production data and real-time process data through an AI algorithm. Optimal work suitable for a strong point of each worker can be disposed (human resource optimization) because productivity data of a worker are collected and analyzed. An improvement in a production process, which is not discovered conventionally, can be derived (process optimization and innovation) because a large amount of collected data is analyzed through AI. Inventory costs and the waste of 4raw materials can be reduced (supply chain optimization) because the supply and demand of raw materials and inventory management are optimized through association with production data. More rapid and accurate decision-making is made possible (the construction of a decision-making support system) because AI-based data the results of the analysis are provided to board of directors in real time. A process can be improved and optimized through simulations in a virtual environment (the implementation of a digital twin) because a digital twin of a production process is implemented based on collected real-time data.

In other words, the present disclosure provides a method of monitoring the current status of data-based production and a system for AI analysis.

In an embodiment of the present disclosure, a method of the computer device monitoring the current status of data-based production may include a step of monitoring the current status of production information based on process data collected in a production process and a step of analyzing a production process based on the collected process data by using an AI model.

In an embodiment of the present disclosure, the step of monitoring the current status of production information may include a step of collecting production facility information, production progress speed and state information of a production process line, work instructions, and a point at which data are obtained in a processing process as the process data.

In an embodiment of the present disclosure, the step of monitoring the current status of production information may include a step of extracting work-related information based on voice information generated through field work manager or field instructions of a production line worker, checking association with production information on the extracted work-related information, extracting process facility and materials-related information and registering a work order, and completing the registration of the registered work order as work instructions through the confirmation of a work manager or a production line worker.

In an embodiment of the present disclosure, the step of monitoring the current status of production information may include a step of producing production-related reporting as the current status of production information is monitored based on the collected process data.

In an embodiment of the present disclosure, the step of monitoring the current status of production information may include a step of collecting equipment data through a sensor and an IoT device installed in each of pieces of equipment of the production process, performing pre-processing on the collected equipment data, extracting production process association ERP data from the equipment data on which the pre-processing has been performed, generating an integrated dataset through the mapping of the extracted production process association ERP data and the equipment data on which the pre-processing has been performed, visualizing the results of analysis through the analysis of the generated integrated dataset, and generating insights and production-related reporting based on the results of the analysis. The equipment data may include a production quantity, an operation time, energy consumption, and quality-related index of each of pieces of equipment.

In an embodiment of the present disclosure, the step of analyzing the production process may include a step of analyzing the production process including an actual production quantity and time and input resources for each situation in the production process based on the collected process data and visualizing production process analysis information so that the production process can be improved through the analyzed production process.

In an embodiment of the present disclosure, the step of monitoring the current status of production information may include a step of collecting manufacturing process management information managed in the enterprise ERP system and providing a production plan versus results thereof based on the collected manufacturing process management information. The step of analyzing the production process may include a step of measuring input resources versus production efficiency based on the collected inventory process management information.

In an embodiment of the present disclosure, the step of analyzing the production process may include a step of classifying the collected process data based on process information for each production product, analyzing abnormality detection or pattern information through an AI model based on the classified process data, training the AI model when the classified process data are new data, distributing a trained AI model to a production analysis system by updating the AI model, and analyzing the production process through the updated AI model in the production analysis system.

In an embodiment of the present disclosure, the step of analyzing the production process may include a step of notifying a manager of alarm in real time when a productivity reduction or abnormality situation is detected based on the production process analysis information obtained through the analyzed production process.

In an embodiment of the present disclosure, the computer device includes at least one processor implemented to execute a computer device-readable instruction, and may monitor, by the at least one processor, the current status of production information based on process data collected in a production process and analyze the production process based on collected process data through an AI model.

Hereinafter, the present disclosure provides a manufacturing process training method and system based on multi-system data association and AI.

Embodiments of the present disclosure relate to a technology that collects manufacturing data generated from each of multiple systems associated with a manufacturing process and performs the analysis of causal relationships between variables for the collected manufacturing data.

The manufacturing process training system according to embodiments of the present disclosure may be implemented with at least one computer device. The manufacturing process training method through multi-system data association according to embodiments of the present disclosure may be performed through at least one computer device included in the manufacturing process training system. In this case, a computer program according to an embodiment of the present disclosure may be installed and driven in the computer device. The computer device may perform the manufacturing process training method through multi-system data association according to embodiments of the present disclosure under the control of the driven computer program. The computer program may be stored in a computer-readable recording medium in order to execute the manufacturing process training method through multi-system data association in a computer in association with the computer device.

Figure 12:
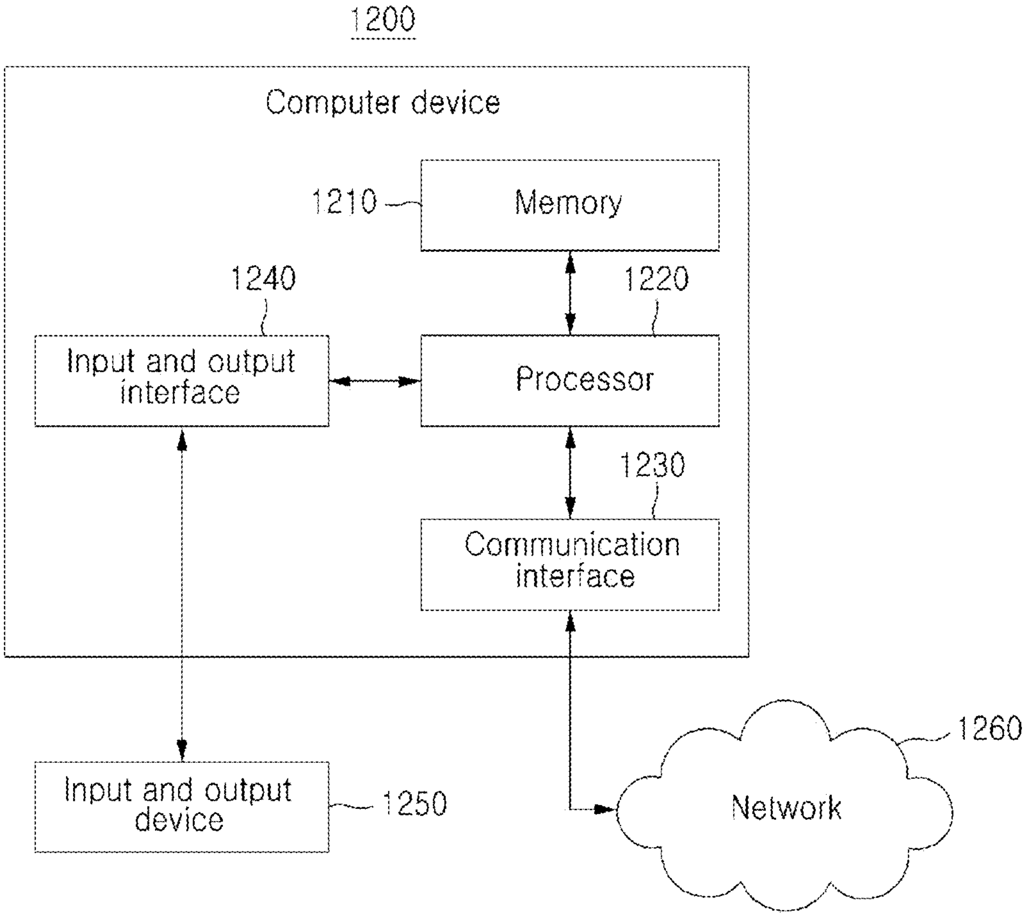
FIG. 12 is a block diagram for describing an example of the internal components of a computer device in an embodiment.

FIG. 12 is a block diagram for describing an example of the internal components of a computer device in an embodiment. For example, the manufacturing process training system according to embodiments of the present disclosure may be implemented with the computer device 1200 illustrated in FIG. 12.

As illustrated in FIG. 12, the computer device 1200 may include memory 1210, a processor 1220, a communication interface 1230, and an input and output interface 1240 as components for executing the method of monitoring the current status of production according to embodiments of the present disclosure.

The memory 1210 is a computer-readable recording medium, and may include random access memory (RAM), read only memory (ROM), and permanent mass storage devices, such as a disk drive. In this case, ROM and permanent mass storage devices, such as a disk drive, is a separate permanent storage device that is different from the memory 1210, and may be included in the computer device 1200. Furthermore, an operating system and at least one program code may be stored in the memory 1210. Such software components may be loaded from a computer-readable recording medium that is different from the memory 1210 onto the memory 1210. Such a separate computer-readable recording medium may include computer-readable recording media, such as a floppy drive, a disk, a tape, a DVD/CD-ROM drive, and a memory card. In another embodiment, the software components may be loaded onto the memory 1210 through the communication interface 1230 not a computer-readable recording medium. For example, the software components may be loaded onto the memory 1210 of the computer device 1200 based on a computer program that is installed by files that are received over a network 1260.

The processor 1220 may be configured to process an instruction of a computer program by performing basic arithmetic, logic, and input/output (I/O) operations. The instructions may be provided to the processor 1220 by the memory 1210 or the communication interface 1230. For example, the processor 1220 may be configured to execute received instructions based on a program code that has been stored in a recording device, such as the memory 1210.

The communication interface 1230 may provide a function for enabling the computer device 1200 to communicate with another computer device over the network 1260. For example, a request, an instruction, data, or a file that is generated by the processor 1220 of the computer device 1200 based on a program code that has been stored in a recording device, such as the memory 1210, may be transferred to other computer devices over the network 1260 under the control of the communication interface 1230. Inversely, a signal, an instruction, data, or a file from another computer device may be received by the computer device 1200 through the communication interface 1230 of the computer device 1200 over the network 1260. A signal, an instruction, a file that is received through the communication interface 1230 may be transmitted to the processor 1220 or the memory 1210. A file that is received through the communication interface 1230 may be stored in a storage medium (e.g., the permanent storage device) which may be further included in the computer device 1200.

The communication method is not limited, and may include short-distance wired/wireless communication between devices, in addition to communication methods using communication networks (e.g., a mobile communication network, wired Internet, wireless Internet, and a broadcasting network) which may be included in the network 1260. For example, the network 1260 may include one or more arbitrary networks of a personal area network (PAN), a local area network (LAN), a campus area network (CAN), a metropolitan area network (MAN), a wide area network (WAN), a broadband network (BBN), and the Internet. Furthermore, the network 1260 may include one or more of network topologies, including a bus network, a star network, a ring network, a mesh network, a star-bus network, and a tree or hierarchical network, but is not limited thereto.

The input and output interface 1240 may be means for an interface with an input and output device 1250. For example, the input device may include a device, such as a microphone, a keyboard, a camera, or a mouse. The output device may include a device, such as a display or a speaker. Furthermore, for example, the input and output interface 1240 may be means for an interface with a device in which functions for an input and an output have been integrated into one, such as a touch screen. The input and output device 1250, together with the computer device 1200, may be configured as a single device.

Furthermore, in other embodiments, the computer device 1200 may include components greater or smaller than the components of FIG. 12. However, it is not necessary to clearly illustrate most of conventional components. For example, the computer device 1200 may be implemented to include at least some of the input and output devices 1250 or may further include other components, such as a transceiver, a camera, various sensors, and a database.

Hereinafter, detailed embodiments of a method and system for collecting manufacturing data of each of multiple systems associated with a manufacturing process and analyzing causal relationships between variables are described.

Figure 13:
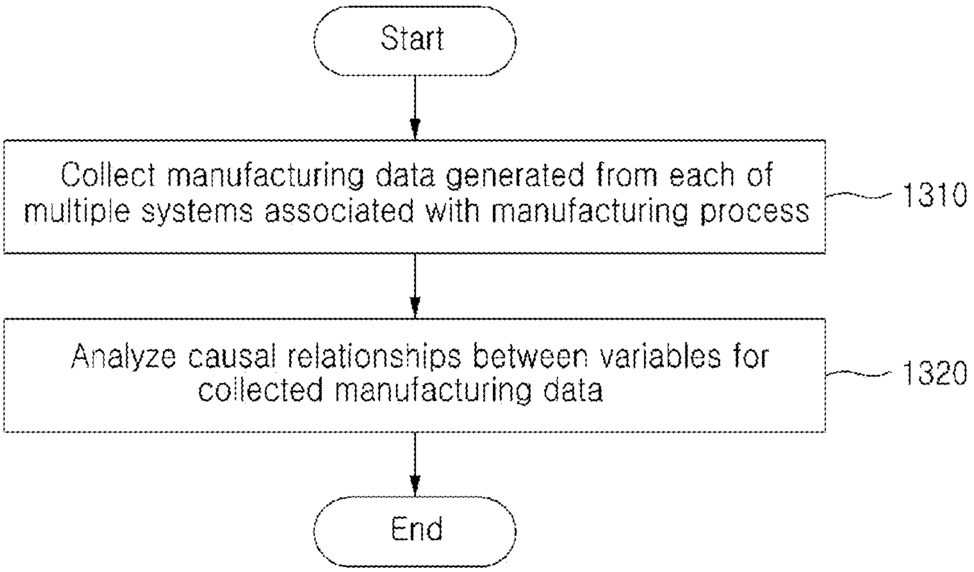
FIG. 13 is a flowchart for describing a manufacturing process training method through data association in an embodiment.

FIG. 13 is a flowchart for describing a manufacturing process training method through data association in an embodiment.

In step 1310, the computer device may collect manufacturing data generated from each of multiple systems associated with a manufacturing process. The computer device may extract major raw table data of purchase, production, quality, and inventory management systems. The computer device may capture and incrementally load change data of each table in real time. The computer device may collect required data through an interface with an external system (e.g., a cooperative company system or external environment data). The computer device may collect real-time data from a site device, such as a facility IoT sensor or a product RFID. In the case of atypical data (e.g., bad cases, field opinions, or management issues), the computer device may standardize and collect the atypical data by using a text mining and natural language processing technique. The computer device may use external data (e.g., public data or social data) within a range in which there is no data security and personal information issues. The computer device may perform data pedigree analysis by systematically managing metadata, such as a data source, collect timing, and quality. The computer device may secure consistent high quality data through regular data quality check and cleansing activities. The computer device may perform pre-processing work that refines, integrates, and standardizes collected data. The computer device may generate feature information that is meaningful in causal relationship analysis by using domain knowledge. The computer device may add time lag features and a moving average as new variables in the case of time-series data.

In step 1320, the computer device may analyze causal relationships between variables for the collected manufacturing data. The computer device may check correlation between variables through a statistical methodology (e.g., regression analysis or a structure equation). The computer device may investigate the causal relationship by using a method, such as Granger causality qualification or a Bayesian network. The computer device may derive major variables and a causal relationship by using a machine learning algorithm, such as a decision tree or a random forest. The computer device may analyze What-if simulation and scenarios for a ripple effect according to a specific variable change. The computer device may construct a simulation model based on causal relationships between major variables. The computer device may analyze and predict a ripple effect according to a specific variable change in a What-if form. The computer device may derive an optimal alternative by simulating various decision-making scenarios. The computer device may interpret and use the results of the analysis of causal relationship and the results of simulations. The computer device may interpret the results of the analysis of causal relationship from a business viewpoint, and may derive insights. The computer device may use the insights for the establishment of a process improvement proposal, decision-making support, and the pre-detection of abnormal symptoms. The computer device can consistently monitor and enhance performance of an analysis model.

Figure 14:
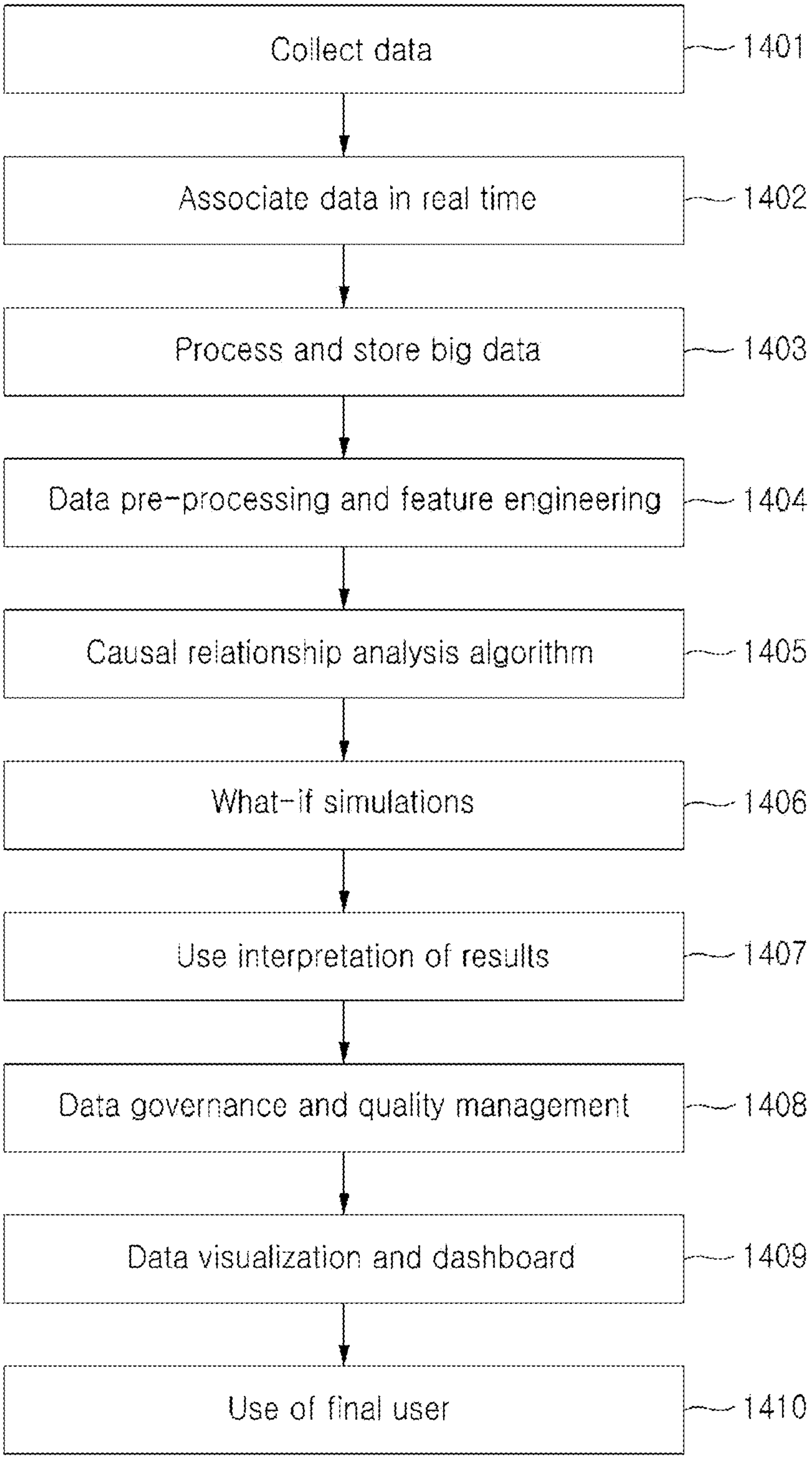
FIG. 14 is a flowchart for describing a detailed operation of manufacturing process training through data association in an embodiment.

FIG. 14 is a flowchart for describing a detailed operation of manufacturing process training through data association in an embodiment.

In step 1401, the computer device may collect manufacturing data of each of the multiple systems associated with a manufacturing process. The computer device may extract raw data of each work system, such as purchase, production, quality, or inventory. The computer device may collect site data in real time through an automatic identification technique, such as an IoT sensor, barcode, or RFID. The computer device may collect required data through an association interface with an external system and public data.

In step 1402, the computer device may associate the collected manufacturing data in real time. The computer device may detect the data change history of each system in real time by using a change data capture technique, and may transmit the detected data change history to a specific space. The computer device may process hundreds of thousands of data per second through a message queuing and distribution streaming processing technique. In this case, the message queuing refers to work that controls an order in which a telegraphic message is stored, processed, and transmitted. The computer device may associate stable data by applying an optimal transfer protocol and data format for each data type.

In step 1403, the computer device may perform big data processing and storage on the associated manufacturing data. The computer device may stably store and manage a large amount of the collected manufacturing data by using a distributed file system and a database. The computer device may rapidly process the collected manufacturing data through a deployment and real-time distribution processing framework, and may process the collected manufacturing data in a form required for analysis. The computer device may optimize data search and utilization performance by applying techniques, such as data compression, indexing, and partitioning.

In step 1404, the computer device may perform data pre-processing and feature engineering on the manufacturing data. The computer device can improve data quality by performing data cleansing work, such as missing value processing, outlier removal, and data normalization. The computer device may generate and integrate derivative variables for the manufacturing data in a form suitable for analysis by using domain knowledge. The computer device may rapidly generate an input value for model development through an automated feature engineering pipeline.

In step 1405, the computer device may perform the analysis of causal relationships between variables on the manufacturing data. The computer device may infer the causal relationships between variables by using a machine training library and recent analysis algorithm (e.g., a K-nearest neighbor algorithm). The computer device may selectively use a statistics-based methodology and a graph-based methodology depending on a data type and an analysis object. The computer device may verify and interpret the reliability of the inferred causal relationships through the estimation of a reliable section or cross-verification.

In step 1406, the computer device may perform What-if simulations based on the analyzed causal relationships between variables. The computer device may simulate a ripple effect according to a change of major variables based on the analyzed causal relationships between variables. The computer device may derive an optimal alternative by performing simulations for each of various decision-making scenarios. The computer device may provide the results of the simulations for each scenario to a user through a reporting and visualization tool.

In step 1407, the computer device may use the results of the analysis of the causal relationships between variables and the results of the simulations in interpretation. The computer device may comprehensively interpret the results of the analysis of causal relationship and the results of the simulations from a business viewpoint, and may derive insights. The computer device may use the results of the analysis in the establishment of a process improvement proposal, decision-making support, and the pre-detection of abnormal symptoms. The computer device may support consistent improvement by providing an analysis model, the version management of data, and a performance monitoring function.

In step 1408, the computer device may perform data governance and quality management. The computer device may establish and manage a governance policy relating to an enterprise data standard, quality, and security. The computer device may automate the profiling and quality verification of the collected manufacturing data, and may collect and monitor a quality index. The computer device may satisfy compliance requirements by applying security policies, such as sensitive information masking, approach control, and authority management.

In step 1409, the computer device may provide data visualization and a dashboard. The computer device may construct a visualization screen that is intuitive and capable of an interaction by using a self-service BI tool. The computer device may search for data from a viewpoint for each work/each user by providing personalization and a role-based dashboard. The computer device may support data-based decision-making by providing alarm and a report subscription function for major indices.

In step 1410, the computer device may provide a constructed system so that a final user can use the constructed system.

According to an embodiment, the insights of the entire process 를 may be derived. A causal relationship and hidden pattern between processes may be discovered by integrating and analyzing individual process data, such as purchase, production, quality, and inventory data. The quality of decision-making can be increased by securing the insights of an enterprise viewpoint not fragmentary information.

Furthermore, a real-time data-based decision-making system may be established. The timeliness of data can be secured and a change can be rapidly handled through real-time data association and processing. Accordingly, pre-emptive decision-making based on data and the establishment of a plan based on prediction are possible.

Furthermore, user-focused information may be provided. A user can autonomously search for and use required information through a self-service data visualization and a dashboard tool. Work efficiency and data utilization can be improved by providing personalized information.

Furthermore, the productivity of analysis work can be improved. Time and efforts that are consumed for analysis work can be reduced by automating repeated work, such as data collection, pre-processing, and feature engineering. An analyzer can concentrate on work having a higher value.

Furthermore, the transparency and traceability of a decision-making process can be secured. A degree of understanding of a decision-making process can be increased by transparently sharing and documenting a data and analysis process, that is, a basis for decision-making. Accordingly, a matter of responsibility of decision-making can be clarified, and a base for post evaluation can be prepared.

Figure 15:
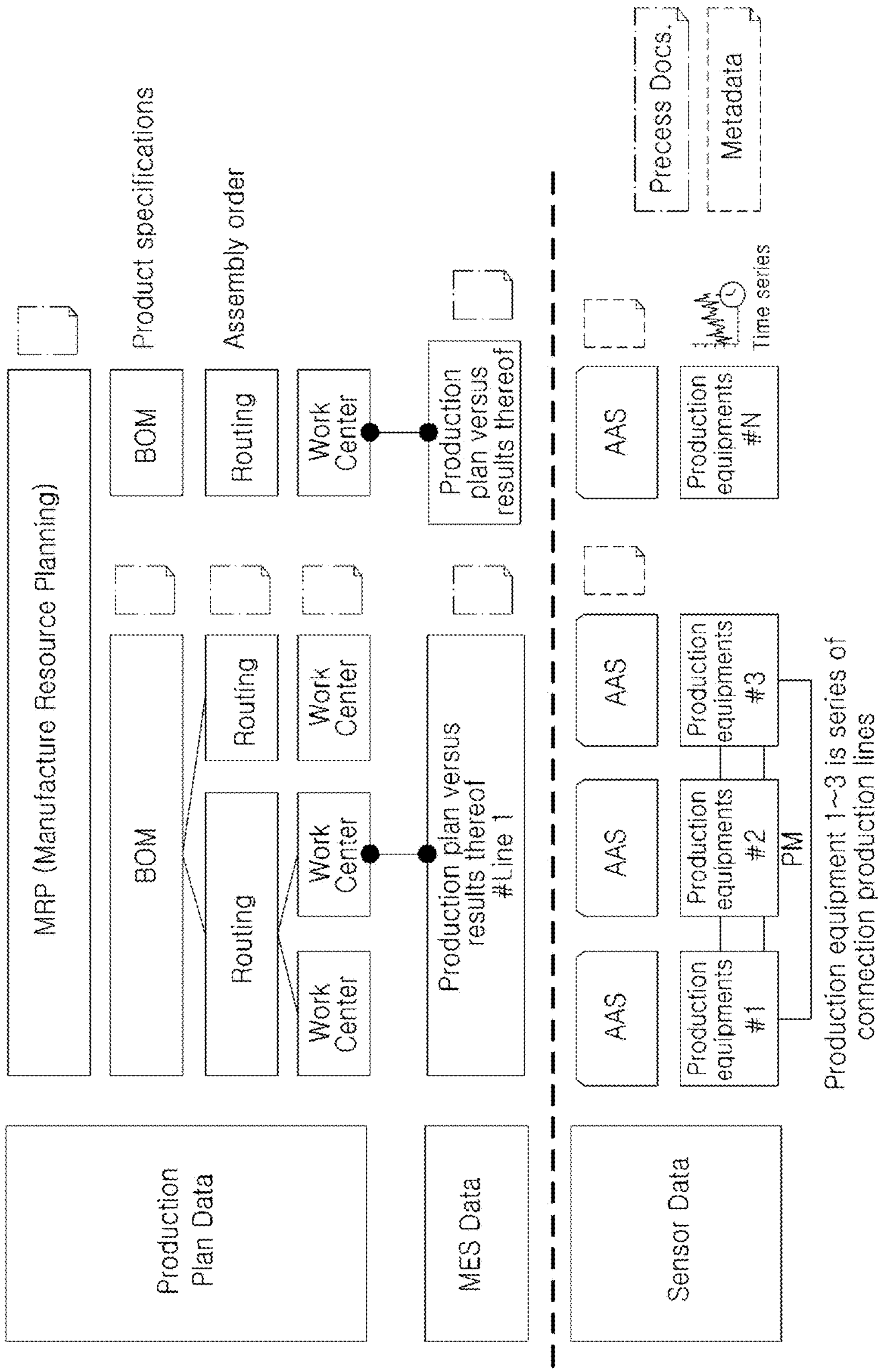
FIGS. 15 and 16 are examples of a system configuration for describing an operation of collecting manufacturing data in an embodiment.
Figure 16:
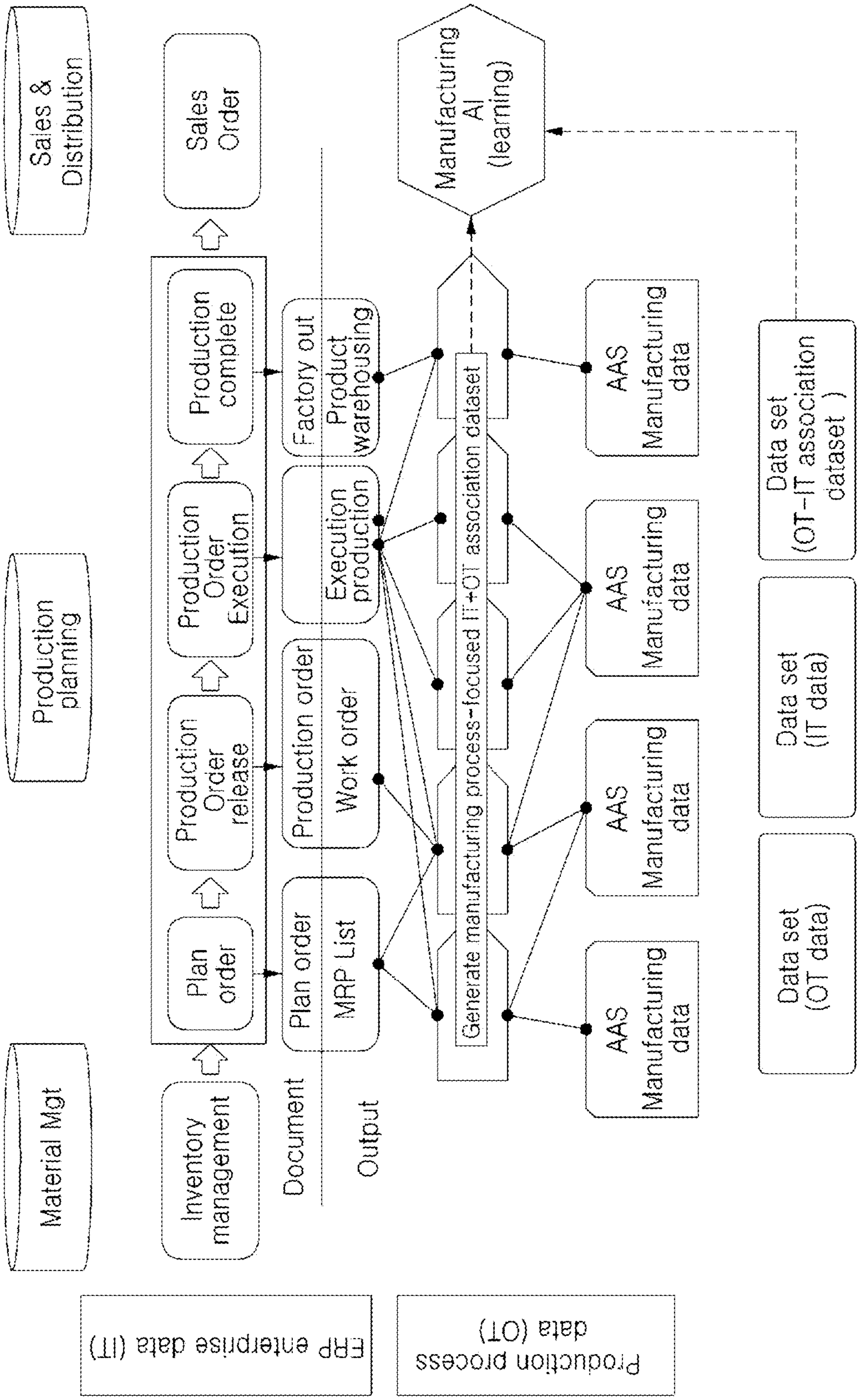

FIGS. 15 and 16 are examples of a system configuration for describing an operation of collecting manufacturing data in an embodiment.

The computer device may collect manufacturing data by connecting enterprise resource planning (ERP) and a manufacturing execution system (MES).

A manufacturing environment may have a construction in which production plan information on the ERP is connected to a production plan of the MES versus results thereof. The production plan of the MES versus results thereof is based on production information received from pieces of equipment of individual production lines. In FIG. 15, an asset administration shell (AAS) means a kind of profiles designed to manage information and functions of assets that are implemented an information world.

Referring to FIG. 16, in an embodiment, manufacturing process information may be obtained by associating production process data and ERP data.

An example in which a manufacturing process training method through multi-system data association, which is proposed in an embodiment, is applied to an enterprise is described.

First, the computer device may optimize a production plan. The computer device may establish an optimal production plan by integrating and analyzing data, such as a product demand, the amount of materials required, a facility utilization rate, and a lead time. In particular, the computer device may predict and handle a ripple effect according to a plan change by using the analysis of causal relationship in a process of adjusting a production plan between a plurality of factories, lines, or facilities. For example, an optimal production plan compromise proposal may be derived by simulating the influence of a production snag attributable to a facility failure of a line A on the plan of lines B and C.

Second, the computer device may foresee and preserve a computer facility. The computer device may predict and handle a potential failure in advance by synthesizing and analyzing the sensor data, utilization history, and preservation history of a facility. The computer device may investigate the root cause of a failure through the analysis of causal relationships out of the simple analysis of statistical correlation, and may establish an effective prevention preservation strategy. For example, the computer device may find out a causal relationship in which a rise of a vibration value in a specific facility is connected to an error rate increase of another facility, and may perform concentration monitoring and pre-emptive preservation measures on a corresponding facility.

Third, the computer device may enhance quality management. The computer device may check and improve the cause of quality abnormality by associating and analyzing various data, such as raw materials quality, process parameters, and environment conditions. The computer device does not simply handle a failure occurrence phenomenon, but can fundamentally solve a quality problem by removing a potential cause of a failure through the analysis of a causal relationship. For example, the computer device may investigate a causal relationship that is connected to a humidity rise→a change in the physical properties of raw materials→an error rate increase in a specific process, may then enhance environment condition management, and may reset process parameters.

Fourth, the computer device may improve a process capability. The computer device may check a performance decline factor in each process and derive an improvement proposal by analyzing various data collected in a plurality of processes. The computer device may enhance the process capability in the entire optimization viewpoint not local optimization by considering a causal relationship in the entire process flow not an individual process viewpoint. For example, the computer device may discover that a cause of increasing a re-work rate in a post process lies in a work method in a prior process, and may improve the entire process efficiency by improving a prior process work standard.

Finally, the computer device may perform the development of a new product and the transfer of mass production. The computer device may predict a potential quality risk factor in advance by integrating and analyzing a related design, experiment, and a prototype in a new product development step. The computer device can pre-emptively prevent a problem which may occur upon transfer of mass production by performing the analysis of quality influence in a mass production condition based on data collected in a pilot production step. For example, the computer device may recognize a yield decline issue according to the application of a new material in advance through the analysis of design-pilot-mass production data, and can solve the yield decline issue through material mixing conditions and process condition optimization.

Accordingly, the present disclosure may achieve the following effects. The entire optimization not local optimization can be realized by securing integrated insights over the entire manufacturing process. A complex effect of productivity improvement, quality improvement, and a cost reduction may be expected through pre-emptive decision-making based on prediction. The present disclosure may perform a bridgehead for manufacturing business digital transformation as a platform for data-based innovation for the entire manufacturing site.

In other words, the present disclosure provides the manufacturing process training method and system based on multi-systems data association and AI.

In an embodiment of the present disclosure, a manufacturing process training method of the computer device through multi-system data association may include a step of collecting manufacturing data generated from each of multiple systems associated with a manufacturing process and a step of analyzing causal relationships between variables for the collected manufacturing data.

In an embodiment of the present disclosure, the step of collecting the manufacturing data may include a step of collecting data from each of the multiple systems including a purchase system, a production system, a quality system, and an inventory management system; a step of collecting site data from a site device including a facility IoT sensor and a product code; a step of collecting data required for the analysis of causal relationships through an association interface with an external system and public data; or a step of collecting standardized data through text mining or natural language processing for atypical data including failure cases, site opinions, and management issues.

In an embodiment of the present disclosure, the step of collecting the manufacturing data may include a step of performing data pre-processing including missing value processing, outlier removal, and data standardization on the collected manufacturing data.

In an embodiment of the present disclosure, the step of collecting the manufacturing data may include a step of generating feature information for the analysis of causal relationships from the manufacturing data on which the data pre-processing has been performed by using domain knowledge.

In an embodiment of the present disclosure, the step of analyzing the causal relationships between variables may include a step of analyzing causal relationships between variables from the collected manufacturing data through a machine training library or an analysis algorithm.

In an embodiment of the present disclosure, the step of analyzing the causal relationships between variables may include a step of constructing a simulation model based on the analyzed causal relationships between variables and performing simulations by using the constructed simulation model.

In an embodiment of the present disclosure, the step of analyzing the causal relationships between variables may include a step of predicting a ripple effect according to a specific variable change through the analyzed causal relationships between variables.

In an embodiment of the present disclosure, the step of analyzing the causal relationships between variables may include a step of deriving an alternative by performing a plurality of different decision-making simulations for each scenario.

In an embodiment of the present disclosure, the step of analyzing the causal relationships between variables may include a step of providing a user with the results of the simulations for each scenario through a visualization tool.

In an embodiment of the present disclosure, the step of analyzing the causal relationships between variables may include a step of using the results of simulations derived through the results of the analyzed causal relationships between variables and the results of interpretation derived through the simulations in the establishment of a process improvement proposal, decision-making support, or the pre-detection of abnormal symptoms.

In an embodiment of the present disclosure, the step of analyzing the causal relationships between variables may include a step of establishing a governance policy relating to enterprise data standard, quality, and security based on the results of the interpretation.

In an embodiment of the present disclosure, the step of analyzing the causal relationships between variables may include a step of monitoring a quality index collected as the quality verification of the manufacturing data is automated according to the established governance policy.

In an embodiment of the present disclosure, the step of analyzing the causal relationships between variables may include a step of supporting data-based decision-making by providing an alarm and report subscription function for each index collected through the monitoring through a dashboard.

In an embodiment of the present disclosure, a computer program stored in a computer-readable storage medium in order to execute the manufacturing process training method of the computer device through multi-system data association may execute a step of collecting manufacturing data generated from each of multiple systems associated with a manufacturing process and a step of analyzing causal relationships between variables for the collected manufacturing data.

In an embodiment of the present disclosure, the computer device includes at least one processor implemented to execute a computer device-readable instruction, and may collect, by the at least one processor, manufacturing data generated from each of multiple systems associated with a manufacturing process and may analyze causal relationships between variables for the collected manufacturing data.

The aforementioned system or stage may be implemented with a hardware component, a SW component, and/or a combination of a hardware component and a SW component. For example, the system or stage described in the embodiments may be implemented with one or more general-purpose computers or special-purpose computers, such as a processor, a controller, an arithmetic logic unit (ALU), a digital signal processor, a microcomputer, a field programmable gate array (FPGA), a programmable logic unit (PLU), a microprocessor, or any other device capable of executing or responding to an instruction. The processing device may perform an operating system (OS) and one or more SW applications that are executed on the OS. Furthermore, the processing device may access, store, manipulate, process, and generate data in response to the execution of SW. For convenience of understanding, one processing device has been illustrated as being used, but a person having ordinary knowledge in the art may understand that the processing device may include a plurality of processing elements and/or a plurality of types of processing elements. For example, the processing device may include a plurality of processors or one processor and one controller. Furthermore, another processing configuration, such as a parallel processor, is also possible.

SW may include a computer program, a code, an instruction or a combination of one or more of them, and may configure a processing device so that the processing device operates as desired or may instruct the processing devices independently or collectively. The SW and/or the data may be embodied in any type of machine, component, physical device, virtual machine, or computer storage medium or device, or a transmitted signal wave permanently or temporarily, in order to be interpreted by the processing device or to provide an instruction or data to the processing device. The SW may be distributed to computer systems that are connected over a network, and may be stored or executed in a distributed manner. The SW and the data may be stored in one or more computer-readable recording media.

The method according to various embodiments may be implemented in the form of a program instruction executable by various computer means, and may be stored in a computer-readable medium. In this case, the medium may continue to store a computer-executable program, or may temporarily store the computer-executable program for execution or download. Furthermore, the medium may be various recording means or storage means having a form in which a single piece of hardware or several pieces of hardware have been combined, and is not limited to a medium that is directly connected to any computer system and may be present by being distributed on a network. Examples of the medium may be magnetic media such as a hard disk, a floppy disk, and a magnetic tape, optical media such as CD-ROM and a DVD, magneto-optical media such as a floptical disk, and may be constructed to store computer instructions, such as, ROM, RAM, and flash memory. Furthermore, examples of another medium may include an app store in which apps are distributed, a site in which other various pieces of software are supplied or distributed, and recording media and/or storage media that are managed in a server.

Various embodiments of this document and the terms used in the embodiments are not intended to limit the technology described in this document to a specific embodiment, but should be construed as including various changes, equivalents and/or alternatives of a corresponding embodiment. In relation to the description of the drawings, similar reference numerals may be used in similar components. An expression of the singular number may include an expression of the plural number unless clearly defined otherwise in the context. In this document, an expression, such as "A or B", "at least one of A and/or B", "A, B, or C" or "at least one of A, B and/or C", may include all of possible combinations of items listed together. Expressions, such as "a first," "a second," "the first", and "the second", may modify corresponding components regardless of its sequence or importance, and are used to only distinguish one component from another component and do not limit corresponding components. When it is described that one (e.g., a first) component is "(functionally or communicatively) connected to" or "coupled with" the other (e.g., a second) component, one component may be directly connected to another component or may be connected to another component through another component (e.g., a third component).

According to various embodiments, each of the aforementioned components may include a single entity or a plurality of entities. According to various embodiments, one or more of the aforementioned components or steps may be omitted or one or more other components or steps may be added. Alternatively or additionally, a plurality of components may be integrated into a single component. In such a case, the integrated component may identically or similarly perform a function performed by a corresponding one of the plurality of components before one or more functions of each of the plurality of components are integrated. According to various embodiments, steps performed by a module, a program or another component may be executed sequentially, in parallel, iteratively or heuristically, or one or more of the steps may be executed in different order or may be omitted, or one or more other steps may be added.

The invention claimed is:

1. A method of managing software (SW) of a manufacturing and production facility for a software bill of materials (SBOM) response, the method being performed by a computer system comprising a SW validator server, a private gateway, a SW configuration server, a SW configuration repository, and at least one edge node connected to at least one piece of equipment within a manufacturing environment and comprising:

issuing, by the SW configuration server, a unique ID of introduced equipment when the introduced equipment from a supplier is introduced into the manufacturing environment, wherein the unique ID is generated based on a unique ID of the edge node when the edge node is connected to the introduced equipment, and wherein the unique ID is arbitrarily generated by a user or is generated based on a unique production ID of the introduced equipment when the edge node is not connected to the introduced equipment;

generating, by the SW configuration server, an authentication key for the supplier based on the unique ID;

providing the supplier with the authentication key;

registering the authentication key with the SW validator server;

authenticating, by the SW validator server, the supplier based on the authentication key;

downloading, through the SW validator server, a SW update package of selected SW from the authenticated supplier;

providing, by the private gateway, the SW update package to an internal production process network of the manufacturing environment;

reviewing, by the SW validator server, the downloaded SW update package by performing a download integrity review and by performing SW management tests in a virtual environment, managing, by the SW configuration server, a SW update history of the at least one piece of equipment while monitoring a SW update of the at least one piece of equipment within a manufacturing environment, wherein the SW update history is stored in the SW configuration repository, wherein the SW update is individually performed on the equipment by the at least one edge node and is monitored through the edge node, and wherein managing the SW update history comprises selecting the SW to be updated, confirming the supplier of the selected SW based on the authentication key corresponding to the equipment of the selected SW, updating the selected SW by using the reviewed SW update package, and recording an update history of the selected SW in the SW configuration repository; and generating, by the SW configuration server, SBOM information based on the SW update history from the SW configuration repository as a response to a request, wherein the request is a request for the SBOM information of a product that is produced in the manufacturing environment or at least one piece of equipment that is selected within the manufacturing environment, and wherein generating the SBOM information comprises confirming at least one piece of equipment that is used to produce the product in the manufacturing environment or the selected at least one piece of equipment, and packaging SW-related information comprising the SW update history of the used at least one piece of equipment or the selected at least one piece of equipment.

2. The method of claim 1, wherein the at least one edge node comprises at least one of an edge node having wireless connectivity and an edge node having wired connectivity.

3. The method of claim 1, wherein the edge node is connected to the equipment through at least one legacy interface comprising at least one of RS232C, serial, USB, SCADA, and a LAN.

4. The method of claim 1, wherein the SW validator server performs supplier identity proof and one or more security checks for the SW update package.

5. The method of claim 1, wherein the SW configuration repository comprises a common database or blockchain that cannot be modified for safe history management.

6. The method of claim 1, wherein the recording of the update history comprises storing update-related information comprising at least one of an indicator, a worker, an update time, target equipment, and a SW hash value of a corresponding update task.

7. The method of claim 1, wherein the confirming of the at least one piece of equipment that is used to produce the product comprises confirming information on the product or equipment on an enterprise resource planning (ERP) system and confirming a production process or equipment information on a manufacturing execution system (MES).

8. A computer system for managing software (SW) of a manufacturing and production facility for a software bill of materials (SBOM) response, the computer system comprising:

a SW validator server configured to authenticate a supplier based on an authentication key and to download a SW update package of selected SW from the authenticated supplier; a private gateway configured to provide the SW update package to an internal production process network of a manufacturing environment;

a SW configuration server configured to manage a SW update history of at least one piece of equipment while monitoring a SW update of at least one piece of equipment within the manufacturing environment; and a SW configuration repository configured to store the SW update history; and, at least one edge node connected to the at least one piece of equipment, wherein the SW update is individually performed on the equipment by the edge node and is monitored through the edge node, wherein the SW configuration server is configured to issue a unique ID of introduced equipment when the introduced equipment from the supplier is introduced into the manufacturing environment, wherein the unique ID is generated based on a unique ID of the edge node when the edge node is connected to the introduced equipment, and wherein the unique ID is arbitrarily generated by a user or is generated based on a unique production ID of the introduced equipment when the edge node is not connected to the introduced equipment, wherein the SW configuration server is configured to generate the authentication key for the supplier based on the unique ID, provide the supplier with the authentication key, and register the authentication key with the SW validator server, wherein the SW validator server is configured to review the downloaded SW update package by performing a download integrity review and by performing SW management tests in a virtual environment, wherein the SW configuration server is configured to select the SW to be updated, confirm the supplier of the selected SW based on the authentication key corresponding to the equipment of the selected SW, update the selected SW by using the reviewed SW update package and record an update history of the selected SW in the SW configuration repository, and wherein the SW configuration server is configured to generate SBOM information based on the SW update history from the SW configuration repository as a response to a request, wherein the request is a request for the SBOM information of a product that is produced in the manufacturing environment or at least one piece of equipment that is selected within the manufacturing environment, and wherein the SW configuration server is configured to generate the SBOM information by confirming at least one piece of equipment that is used to produce the product in the manufacturing environment or the selected at least one piece of equipment, and packaging SW-related information comprising the SW update history of the used at least one piece of equipment of the selected at least one piece of equipment.

9. The computer system of claim 8, wherein the at least one edge node comprises at least one of an edge node having wireless connectivity and an edge node having wired connectivity.

10. The computer system of claim 8, wherein the edge node is configured to connect to the equipment through at least one legacy interface comprising at least one of RS232C, serial, USB, SCADA and a LAN.

11. The computer system of claim 8, wherein the SW validator server is configured to perform supplier identity proof and one or more security checks for the SW update package.

12. The computer system of claim 8, wherein the SW configuration repository comprises a common database or blockchain that cannot be modified for safe history management.

13. The computer system of claim 8, wherein the SW configuration repository is configured to store update-related information comprising at least one of an indicator, a worker, an update time, target equipment, and a SW hash value of a corresponding update task.

14. The computer system of claim 8, wherein the computer system comprises an information management system comprising at least one of an enterprise resource planning (ERP) system and a manufacturing execution system (MES), and wherein the SW configuration server is configured to confirm information on the product or equipment on the ERP system and confirm a production process or equipment information on the MES.

* * * * *